United States Patent
Zamani et al.

(10) Patent No.: US 11,902,456 B2
(45) Date of Patent: Feb. 13, 2024

(54) BLOCKCHAIN SHARDING WITH ADJUSTABLE QUORUMS

(71) Applicant: Visa International Service Association, San Francisco, CA (US)

(72) Inventors: Mahdi Zamani, Pala Alto, CA (US); Mustafa Ozdayi, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/640,164

(22) PCT Filed: Sep. 11, 2020

(86) PCT No.: PCT/US2020/050473
§ 371 (c)(1),
(2) Date: Mar. 3, 2022

(87) PCT Pub. No.: WO2021/050929
PCT Pub. Date: Mar. 18, 2021

(65) Prior Publication Data
US 2022/0271957 A1    Aug. 25, 2022

Related U.S. Application Data

(60) Provisional application No. 62/898,905, filed on Sep. 11, 2019.

(51) Int. Cl.
*H04L 9/00* (2022.01)
*G06F 16/901* (2019.01)
*H04L 9/32* (2006.01)

(52) U.S. Cl.
CPC ............ *H04L 9/50* (2022.05); *G06F 16/9027* (2019.01); *H04L 9/3265* (2013.01)

(58) Field of Classification Search
CPC ...... H04L 9/50; H04L 9/3265; G06F 16/9027
See application file for complete search history.

(56) References Cited

U.S. PATENT DOCUMENTS 9,998,150 B1 *   6/2018   Lazier ............... H03M 13/2942
10,394,789 B1 *  8/2019   Animesh ............ G06F 16/2282
(Continued)

FOREIGN PATENT DOCUMENTS

| CN | 106445711 A | 2/2017 |
| CN | 108288159 A | 7/2018 |

(Continued)

OTHER PUBLICATIONS

PCT/US2020/050473, "International Search Report and Written Opinion", dated Dec. 15, 2020, 8 pages.
(Continued)

*Primary Examiner* — Taghi T Arani
*Assistant Examiner* — Blake I Narramore
(74) *Attorney, Agent, or Firm* — Kilpatrick Townsend & Stockton LLP

(57) ABSTRACT

A method includes broadcasting, by a node computer, a propose message comprising a new block for a blockchain to a plurality of node computers in a network shard. The node computer can receive at least one vote message from the plurality of node computers, the at least one vote message indicating verification of the new block. The node computer can, after a predetermined amount of time, receive a plurality of pre-commit messages comprising at least the new block and a block certificate created based on the at least one vote message. If the number of received pre-commit messages of the plurality of pre-commit messages is greater than a quorum value associated with the network shard, the node computer can commit the new block to the blockchain.

20 Claims, 12 Drawing Sheets

(56) References Cited

U.S. PATENT DOCUMENTS

| | | | | |
|---|---|---|---|---|
| 10,860,259 | B1* | 12/2020 | Winarski | G06F 12/121 |
| 11,019,123 | B2* | 5/2021 | Bastian | H04L 65/613 |
| 11,334,678 | B2* | 5/2022 | Mizrakhi | G06F 16/2358 |
| 2016/0292672 | A1* | 10/2016 | Fay | G06Q 20/3829 |
| 2017/0193464 | A1* | 7/2017 | Sher | G06Q 20/065 |
| 2018/0039667 | A1* | 2/2018 | Pierce | H04L 9/3247 |
| 2018/0174143 | A1* | 6/2018 | Bastide | G06Q 20/4016 |
| 2018/0248880 | A1* | 8/2018 | Sardesai | H04L 63/101 |
| 2018/0337769 | A1* | 11/2018 | Gleichauf | H04L 9/0637 |
| 2018/0341930 | A1* | 11/2018 | Moir | G06F 16/27 |
| 2018/0349621 | A1* | 12/2018 | Schvey | G06F 21/645 |
| 2018/0357264 | A1* | 12/2018 | Rice | G06F 16/278 |
| 2019/0012466 | A1* | 1/2019 | Ricotta | H04L 63/102 |
| 2019/0018888 | A1* | 1/2019 | Madisetti | H04L 9/3236 |
| 2019/0140935 | A1* | 5/2019 | Kikinis | G06F 16/182 |
| 2019/0182313 | A1* | 6/2019 | Yoo | H04L 67/10 |
| 2019/0188711 | A1* | 6/2019 | Wu | G06Q 20/227 |
| 2019/0251077 | A1* | 8/2019 | Yang | G06F 16/2379 |
| 2019/0363874 | A1 | 11/2019 | Shirley et al. | |
| 2020/0183586 | A1* | 6/2020 | Yang | G06F 3/061 |
| 2020/0210413 | A1* | 7/2020 | Quick | H04L 9/3255 |
| 2021/0019745 | A1* | 1/2021 | Chabanne | G06Q 20/401 |
| 2022/0191037 | A1* | 6/2022 | Hassanzadeh Nazarabadi | G06Q 20/065 |

FOREIGN PATENT DOCUMENTS

| | | |
|---|---|---|
| WO | 2018217804 A1 | 11/2018 |
| WO | 2019/217669 A1 | 11/2019 |

OTHER PUBLICATIONS

Harmony, "Technical Whitepaper", Harmony Team, Version 2.0, 22 pages.

Andrychowicz et al. PoW-Based Distributed Cryptography with No Trusted Setup SpringerLink, Aug. 2015, 26 pages.

Boneh et al., "Batching Techniques for Accumulators with Applications to IOPs and Stateless Blockchains", 2018, 45 pages.

Decker et al., "Bitcoin Meets Strong Consistency", Dec. 26, 2014, 10 pages.

Gennaro et al., "Secure distributed key generation for discrete-log based cryptosystems", 1999, 16 pages.

Gilad et al., Algorand: Scaling Byzantine Agreements for Cryptocurrencies, 2017, 18 pages.

Hanke et al., "Dfinity technology overview series, consensus system", May 11, 2018, 16 pages.

Karp et al., "Randomized Rumor Spreading", 2000, 20 pages.

Kogias et al., "Enhancing bitcoin security and performance with strong consistency via Collective Signing," 2016, 18 pages.

Kogias et al., "Omni Ledger: A secure, Scale-Out, Decentralized Ledger Via Sharding", 2018, 16 pages.

Luu et al., "A Secure Sharding Protocol for Open Blockchains", 2016, 14 pages.

Malkhi et al., "Solida: A Blockchain Protocol Based on Reconfigurable Byzantine Consensus", 2017, 17 pages.

Nakamoto, "Bitcoin: A Peer-to-Peer Electronic Cash System", 2008, 9 pages.

Pass et al., "Hybrid Consensus: Efficient Consensus in the Permissionless Model", .2016, 56 pages.

Pease et al., "Reaching Agreement in the Presence Fault", 1980, 7 pages.

Poon et al., "Then Bicoin Lighting Network: Scalable Off-Chain Instant Payments", 2016, 59 pages.

Sonnino et al., "Replay attacks and defenses against cross-shard consensus in sharded distributed ledgers", 2019, 15 pages.

Zamiani et al., "RapidChain: Scaling Blockchain via Full Sharding", 2018, 18 pages.

Dang et al., "Towards Scaling Blockchain Systems via Sharding", Designing Interactive Systems Conference, Jun. 25, 2019, pp. 123-140.

EP20863017.8 , "Extended European Search Report", dated Aug. 23, 2022, 8 pages.

Zamani et al., "RapidChain Scaling Blockchain via Full Sharding", CCS '18: Proceedings of The 2018 Acm Sigsac Conference on Computer and Communications Security, Oct. 15, 2018, pp. 931-948.

EP20863017.8, "Office Action", dated Aug. 11, 2023, 7 pages.

"MultiVAC Yellow Paper—Fully Scalable Blockchain with Full Dimensional Sharding for Compute, Storage, and Transmission", Available Online at https://baijiahao.baidu.com/s?id=1626770690322433554&wfr=spider&for=pc, Mar. 1, 2019 (34 pages).

CN202080064133.9, "Office Action", dated Oct. 21, 2023, 60 pages.

\* cited by examiner

BLOCKCHAIN SHARDING WITH ADJUSTABLE QUORUMS

CROSS-REFERENCES TO RELATED APPLICATIONS

This application is a National Stage of International Application No. PCT/US2020/050473, filed on Sep. 11, 2020, which claims the benefit of U.S. Provisional Application No. 62/898,905, filed Sep. 11, 2019, which are herein incorporated by reference in their entirety for all purposes.

BACKGROUND

Sharding is an approach for scaling blockchain protocols with the network size: the network is partitioned (e.g., via random sampling) into small groups of validator nodes, known as shards, which process interactions in parallel by achieving Byzantine consensus on behalf of the entire population of nodes in the network. Shards can sign interactions (e.g., transactions) at a significantly-faster rate than the entire network due to their smaller size and the fact that consensus protocols incur at least a quadratic (in the number of participants) message complexity.

Nevertheless, shards cannot be made arbitrarily small due to the likelihood of forming corrupt shards, where malicious nodes take over a sufficient majority of the network shard, compromising the security of the entire sharding protocol. In fact, the probability of such an event increases exponentially with the inverse of the network shard size, resulting in large shards that consist of several hundreds of nodes in practice.

Embodiments of the invention address these and other problems individually and collectively.

BRIEF SUMMARY

One embodiment of the disclosure is related to a method comprising: broadcasting, by a node computer, a propose message comprising a new block for a blockchain to a plurality of node computers in a network shard; receiving, by the node computer, at least one vote message from the plurality of node computers, the at least one vote message indicating verification of the new block; after a predetermined amount of time, receiving, by the node computer, a plurality of pre-commit messages comprising at least the new block and a block certificate created based on the at least one vote message; and if the number of received pre-commit messages of the plurality of pre-commit messages is greater than a quorum value associated with the network shard, committing, by the node computer, the new block to the blockchain.

Another embodiment of the disclosure is related to a node computer programmed to perform the above-noted method.

Further details regarding embodiments of the invention can be found in the Detailed Description and the Figures.

DETAILED DESCRIPTION

Figure 1:
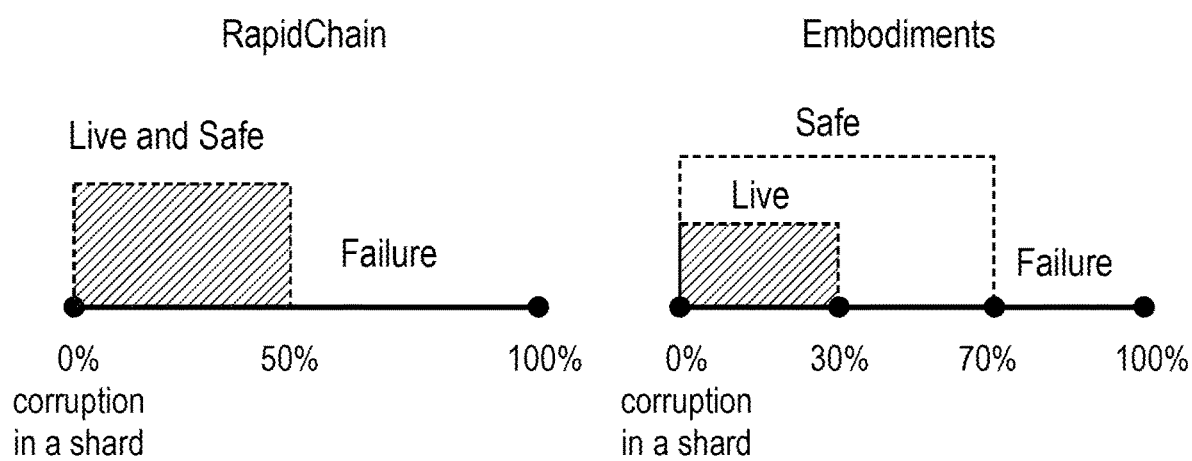
FIG. 1 shows a comparison of shard corruption of embodiments to previous work.

Prior to discussing embodiments of the invention, some terms can be described in further detail.

A "blockchain" can be a growing list of records linked by cryptography. A blockchain can include a series of blocks. Each block in the blockchain may include an electronic record of one or more historical transactions, as well as metadata. In some embodiments, blocks in the blockchain can be linked by including a reference to the previous block (e.g., a hash output of a previous block). Content in each new block in the blockchain may be algorithmically determined based on new transactions and previous blocks in the blockchain. The information in a blockchain can be immutable. A blockchain can be sharded into blockchain shards that are stored at committees. For example, a committee can store a shard of a blockchain, while a different committee can store a different shard of the blockchain.

A "verification network" can include a set of computer nodes programmed to provide verification for an interaction. A verification network may be a distributed computing system that uses several computer nodes that are interconnected via communication links. A verification network may be implemented using any appropriate network, including an intranet, the Internet, a cellular network, a local area network or any other such network or combination thereof. In some cases, nodes may be independently operated by third party or administrative entities. Such entities can add or remove computer nodes from the verification network on a continuous basis. In some embodiments, a node in a verification network may be a full node.

A "node" may be a point at which lines or pathways intersect or branch or can be a central or connecting point. In some cases, a node can be a "computer node," which can be any computer or group of computers that can operate independently and within a network containing the node. In some embodiments, a node that can fully verify each block and interaction in the blockchain can be characterized as a "full node." In some cases, a full node can store a full blockchain (i.e., each block and each interaction). In some cases, a client device may be a node computer in a verification network.

A "network shard" can include a sub-group of nodes (e.g., node computers) of a network. A network shard can include any suitable number of node computers of the network, and there may be any suitable number of network shards in the network. In some cases, node computers in a network shard can be validator nodes in a blockchain network. Node computers in a network shard can maintain a blockchain or a portion of a blockchain. In some embodiments, the blockchain maintained by the network shard can be a blockchain shard. A "blockchain shard" can be a portion of a blockchain. The portion may include a number of blocks of a blockchain, but not the entire blockchain. In some embodiments, each network shard in a verification network may include the same number of node computers.

A "reference network shard" can include a network shard that can act as a reference for node computers in the network. A reference network shard can include a number of node computers that can periodically reconfigure the network shards in the network. Node computers of a reference shard can maintain and update a node-to-shard table and an interaction-to-shard table. Node computers of the reference shard can broadcast updates to the node-to-shard table and the interaction-to-shard table to the network shards of the network. A reference shard can include an honest-majority of node computers.

A "block" can include a data element that holds records of one or more interactions, and can be a sub-component of a blockchain. A block can include a block header and a block body. A block can include a batch of valid interactions that are hashed and encoded into a Merkle tree. Each block can include a cryptographic hash of the prior block (or blocks) in the blockchain.

A "block header" can be a header including information regarding a block. A block header can be used to identify a particular block an a blockchain. A block header can comprise any suitable information, such as a previous hash, a Merkle root, a timestamp, and a nonce. In some embodiments, a block header can also include a difficulty value.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" may be data associated with an interaction. For example, an interaction may be a transfer of a digital asset from one party to another party. The interaction data for example, may include a transaction amount and unspent transaction outputs (UTXOs). In some embodiments, interaction data can indicate different entities that are party to an interaction as well as value or information being exchanged. Interaction data can include a value, information associated with a sender (e.g., a token or account information, an alias, a device identifier, a contact address, etc.), information associated with a receiver (e.g., a token or account information, an alias, a device identifier, a contact address, etc.), one-time values (e.g., a random value, a nonce, a timestamp, a counter, etc.), and/or any other suitable information. An example of interaction data can be transaction data.

A "digital asset" may refer to digital content associated with a value. In some cases, the digital asset may also indicate a transfer of the value. For example, a digital asset may include data that indicates a transfer of a currency value (e.g., fiat currency or crypto currency). In other embodiments, the digital asset may correspond to other non-currency values, such as access privileges data (e.g., a number of authorized usages or a time allotment for accessing information) and ownership data (e.g., digital right data). A digital asset may also include information about one or more digital asset attributes. For example, a digital asset may include information useful for transferring value from one entity or account to another. A digital asset may also include remittance information (e.g., information identifying a sending entity). In some embodiments, a digital asset may include one or more of a digital asset identifier, a value (e.g., an amount, an original currency type, a destination currency type, etc.), transfer fee information, a currency exchange rate, an invoice number, a purchase order number, a timestamp, a sending entity identifier (e.g., a sender enterprise ID), a sending entity account number, a sending entity name, sending entity contact information (e.g., an address, phone number, email address, etc.), sending institution information (e.g., a financial institution name, enterprise ID, and BIN), a recipient entity identifier (e.g., a recipient enterprise ID), a recipient entity account number, a recipient entity name, recipient entity contact information (e.g., an address, phone number, email address, etc.), and/or recipient institution information (e.g., a financial institution name, enterprise ID, and BIN). When a digital asset is received, the recipient may have sufficient information to proceed with a settlement transaction for the indicated value.

The term "verification" and its derivatives can include a process that utilizes information to determine whether an underlying subject is valid under a given set of circumstances. Verification may include any comparison of information to ensure some data or information is correct, valid, accurate, legitimate, and/or in good standing.

A "quorum value" can include a thereshold number of votes. Each network shard in a verification network can have a quorum value that indicates a number of votes needed to perform particular functions. For example, a leader node of a network shard can propose a new block for the blockchain. Each node computer of the network shard can vote on whether or not the new block should be included into the blockchain based on one or more criteria. If at least a quorum value number of node computers vote to include the new block in the blockchain, then the new block can be included in the blockchain.

An "accumulator value" can include a binding commitment on a set. An accumulator can be a one way membership function. An accumulator can accumulate one or more values (e.g., amounts, outputs, etc.) into an accumulator value. An accumulator can answer a query as to whether a potential candidate value is a member of the set (e.g., of accumulated values) without revealing the individual members of the set.

A "Merkle tree" can be a data structure that can encode interaction data. A Merkle tree can be a balanced binary tree where the leaf nodes of the tree hold some value, and each non-leaf node can store a hash of a concatenation of the values of at least two children nodes. When a new leaf is added to a Merkle tree, the entire tree can be recomputed. For example, each node in the Merkle tree can be determined to be the hash of at least two children nodes.

A "Merkle proof" can be a proof that an interaction is included in a Merkle tree. A Merkle proof can include a path from a Merkle root of a Merkle tree to a node associated with an interaction identifier as well as sibling nodes of each node in the path. The path can include each node connecting the Merkle root node to the node associated with the interaction identifier.

A "view number" can include a value that identifies a particular node computer. A view number can be an value that uniquely identifies a leader node computer of a particular network shard. For example, each node computer of a network shard can include a view number in any broadcast message, then check received messages to verify that the view number is the same in each message. Doing so, can verify that each node computer in the network shard agrees that a particular node computer associated with the view number is the leader node computer for a current epoch.

A "block certificate" can include a data item that can act as evidence or proof of a block. A block certificate can be a threshold signature. The threshold signature can be generated based on individual signature shares from shares of a private key (e.g., shared through a network shard). For example, when a node computer sends a vote message to vote for a block to be included into a blockchain, the node computer signs the vote message's hash digest with the node computer's share of a secret key of the node computer's network shard. A quorum number of signatures on the vote message constitute a block certificate on the block.

A "propose message" can include a message that proposes an action or plan. A propose message can include a proposal to include a new block in a blockchain. A propose message can be broadcast by a node computer of a network shard to other node computers of the network shard. A propose message can include a new block that is to be proposed to the network shard. A propose message can also include a view number and a block certificate of the previous block in the blockchain.

A "vote message" can include a message that votes for an action or plan. A vote message can be provided in response to a propose message. A vote message can include an indication that the message is a vote message and/or a vote (e.g., yes, no, 0, 1, etc.). A vote message can include a view number and a new block that is proposed to be added to a blockchain (e.g., as proposed in a propose message).

A "pre-commit message" can include a message that indicates precommitment to an action or plan. A pre-commit message can be provided in response to vote messages if there is no equivocation in a network shard. A pre-commit message can include a view number. A pre-commit message can also include a new block that is to that is proposed to be added to a blockchain (e.g., as proposed in a propose message) and is voted to be added to the blockchain (e.g., as voted in a vote message). A pre-commit message can also include a block certificate for the new block.

A "commit interaction request message" can include a message requesting commitment of an interaction. A commit interaction request message can include interaction data and one or more proof-of-inclusions. A commit interaction request message can be sent from a client device to a node computer in a network shard to request that an interaction (e.g., a transaction) be included in a blockchain maintained by the network shard.

A "proof-of-inclusion" can include evidence that something is included in something else. A proof-of-inclusion can include evidence that an amount such as an unspent transaction output (UTXO) is or was included in a block of a blockchain. For example, a client device can request a proof-of-inclusion of an amount x from a first network shard, such that a transaction can be committed to in a second network shard. The proof-of-inclusion can attest that the output (e.g., UTXO of the first network shard) referenced by an input (e.g., an amount that will be spend at the second network shard) is stored in the blockchain maintained the first network shard and, in some cases, that the output has been removed for the transaction. A proof-of-inclusion can include a Merkle tree, a block header, and a commitment proof that a block associated with the block header is included in a blockchain.

A "shutdown message" can include a message that requests closure. A shutdown message can request closure of a network shard. A plurality of honest node computers of a network shard may generate and transmit shutdown messages to a reference network shard to request that the network shard be closed for a current epoch. A shutdown message can include a request to close a network shard and a network shard identifier. In some embodiments, a shutdown message can include a reason for the requested shutdown (e.g., vote inactivity, pre-commit inactivity, view-change inactivity, a view-change bound, etc.). In some embodiments, a shutdown message can be created if an inactivity timer reaches zero (e.g., indicates that the state of a network shard is inactive).

An "inactivity timer" can include a mechanism for detecting a state of being inactive. An inactivity timer can be set locally by each node computer in a network shard. An inactivity timer can be set to a predetermined amount of time. For example, an inactivity timer can be set to a value of two times an upper bound on the message delivery time (e.g., $2\Delta$). A node computer can set the inactivity timer to the predetermined amount of time after performing an action to which the node computer expects a response. The inactivity timer can count down to zero as time progresses with no actions taking place.

A "propose table update message" can include a message that proposes an updated table. A propose table update message can include a node-to-shard table. A propose table update message can be broadcast by one or more node computers in a reference network shard to a node computers in a plurality of network shards in a network.

A "node-to-shard table" can include a table that associates computer nodes with network shards. A node-to-shard table can be a reference table that associates each computer node in a network with a network shard in the network. A node-to-shard table can indicate which computer nodes are assigned to which network shards for a current epoch. In some embodiments, a node-to-shard table can include a null network shard as one of the network shards in the table. The null network shard can be a network shard that groups together computer nodes that will not be in network shards that process interactions during the current epoch. A node-to-shard table can be maintained by a reference network shard in the network. A node-to-shard table can include node computer identifiers for the node computers and shard identifiers for the network shards. In some embodiments, the node-to-shard table can include an IP address or other communication information of each node computer.

An "interaction-to-shard table" can include a table that associates interactions with network shards. An interaction-to-shard table can be a reference table that associates each new interaction (e.g., new interactions provided to the network) to a network shard in the network. An interaction-to-shard table can be maintained by a reference network shard in the network. A reference network shard can associate new interactions with network shards based on a determined hash of the new interaction.

A "commitment process" can include a series of steps taken to commit to a value. A commitment process can include node computers of a network shard determining whether or not to commit to a particular action (e.g., including a new block in a blockchain, updating a node-to-shard table, etc.) and committing to the action. A commitment process can occur after a node computer (e.g., a leader node) proposes an action to a plurality of node computers in a network shard. A commitment process can include providing vote messages and pre-commit messages regarding the proposed action. A commitment process can result in a commitment to the action based on at least the pre-commit messages. In some embodiments, a quorum value number of pre-commit messages may be needed to commit to an action.

A "user" may include an individual. In some embodiments, a user may be associated with one or more personal accounts and/or client devices.

A "client device" may be a computing device capable of transmitting and/or receiving data to and from a node computer. Examples of client devices may include a mobile phone, a smart phone, a personal digital assistant (PDA), a laptop computer, a desktop computer, a server computer, a vehicle such as an automobile, a light client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments can include a scalable blockchain sharding protocol that achieves significantly higher throughputs than existing solutions by creating considerably smaller network shards. To ensure that malicious nodes cannot compromise the protocol's integrity (e.g., double-spend money), the consensus protocol's quorum size can be adjusted when committing new blocks of transactions. Depending upon the number of corrupt nodes allowed in each network shard, the quorum size can be selected in such a way that (1) malicious nodes can never form a quorum in any shard, and (2) honest nodes can always form a quorum in at least some of the network shards. Further, embodiments of the invention can include a cross-shard transaction verification protocol that reduces inter-shard communication and removes the storage overhead of maintaining blocks of transactions.

I. Context

Various embodiments can utilize and relate to Byzantine fault tolerant state-machine replication (BFT SMR), blockchain sharding, accumulators, and stateless blockchains, each of which are described in the following section.

A. Byzantine Fault Tolerant State-Machine Replication

In Byzantine fault tolerant state-machine replication, a group of nodes can attempt to agree on a sequence of values without the help of a third party, even when some of the nodes are possibly controlled by a Byzantine adversary who can make faulty nodes that arbitrarily deviate from the protocol. The correctness of a state-machine replication protocol can be evaluated based on two properties: safety and liveness. Safety can guarantee that all honest nodes process the same sequence of interactions (e.g., transactions). Liveness can ensure that all correct interactions are eventually processed (e.g., the interaction does not remain pending indefinitely). The solvability of state-machine replication may depend on a maximum number of faulty nodes allowed depending on the network synchrony assumptions. For example, under a synchronous network assumption, an honest majority of nodes may be needed [6]. Under a partially-synchronous network, the fraction of corrupt nodes can be bounded from above by ⅓, for example. Further, no deterministic asynchronous protocol can solve the state-machine replication [9]. To avoid this impossibility and/or to achieve practicality, various embodiments can provide probabilistic safety or liveness guarantees. In the latter case, embodiments can provide eventual liveness (or eventual consistency) since nodes can decide on a value with probability one, but with no time bound.

B. Blockchain Sharding

Sharded blockchain protocols can increase interaction processing power with the number of participants joining the network by allowing multiple committees of nodes to process incoming transactions in parallel. Thus, the total number of interactions processed in each consensus round by the entire protocol is multiplied by the number of committees.

Luu et al. [3] propose Elastico, a sharded consensus protocol for public blockchains. In every consensus epoch, each participant solves a proof-of-work (PoW) puzzle based on an epoch randomness obtained from the last state of the blockchain. The PoW's least-significant bits are used to determine the committees that coordinate with each other to process transactions. Kokoris-Kogias et al. [4] propose OmniLedger, a sharded distributed ledger protocol that attempts to fix some of the issues of Elastico. Assuming a slowly-adaptive adversary that can corrupt up to a ¼ fraction of the nodes at the beginning of each epoch, the protocol runs a global reconfiguration protocol at every epoch (about once a day) to allow new participants to join the protocol. OmniLedger generates identities and assigns participants to committees using a slow identity blockchain protocol that assumes synchronous channels. A fresh randomness is generated in each epoch using a bias-resistant random generation protocol that relies on a verifiable random function (VRF) [10] for unpredictable leader election in a way similar to the lottery algorithm of Algorand [11].

Zamani et al. [5] propose RapidChain, a sharded blockchain protocol in the ⅓ corruption setting that can achieve complete sharding of the communication, computation, and storage overhead of processing transactions without assuming any trusted setup. RapidChain employs an intra-committee consensus algorithm that can achieve high throughput via block pipelining, a gossiping protocol for large blocks, and a reconfiguration mechanism based on cuckoo rule [12].

C. Accumulators

An accumulator can be a binding commitment on a set. In some embodiments, an accumulator can be a tool that provides a succinct representation of a set that can be queried for membership and possibly for non-membership. Accumulators can be used with blockchains due to the "stateless" blockchain model [13], [14], [15]. In the stateless blockchain model, validators maintain an accumulator over the UTXO or account sets rather than explicitly maintaining the account sets. It is up to the clients to maintain the explicit set by listening to the network and providing membership proofs on their transactions to spend their UTXOs or balances. Various embodiments can utilize an RSA accumulator scheme described in [15]. Briefly, an accumulator according to various embodiments can perform the following functionalities:

1. Add(A, x). Given an accumulator A and an element x, add x to A.
2. Delete(A, x). Given an accumulator A and an element x, delete x from A if x exists in A.
3. GenMemWitness(S, x). Given a set S and an element x∈S, generate a membership witness w for x.
4. GenNonMemWitness(S, y). Given a set S and an element y∉S, generate a non-membership witness u for y.
5. VerMem(A, x, w). Given an accumulator A which includes elements of a set S, an element x and a membership witness w, returns 1 if w=GenMemWitness(S, x) and 0 otherwise.
6. VerNonMem(A, y, u). Given an accumulator A which includes elements of a set S, an element y and a non-membership witness u, returns 1 if u=GenNonMemWitness(S, y) and 0 otherwise.

RSA accumulators are based on the one-way RSA function $\alpha \rightarrow g^\alpha$ mod N for a suitably chosen N. The set $\{a_1, \ldots, a_n\}$ is compactly represented by the accumulator $A=g^{a_1, \ldots, a_n}$. The witness w for an element $a_i$ is built like A, but skips the $a_i$ exponent, and checking the witness is done by checking that $w^{a_i}$ equals A. Adding elements $\{b_1, \ldots, b_m\}$ to the accumulator is done by raising A by the "update" $\{b_1, \ldots, b_m\}$, and likewise for the witness w.

RSA accumulators are constant in size (a single group element) and their witness updates are separated from other set elements. In contrast, Merkle trees are linear in size (e.g., by number of leaves), and an update to one element modifies internal tree nodes, invalidating Merkle proofs for other elements. Also, while updates to RSA accumulators can be batched, Merkle tree updates take logarithmic time for each element.

D. Stateless Blockchains

The term stateless blockchain can include a blockchain design where (validator) nodes can process transactions without requiring the nodes to store and maintain the explicit blockchain state. This reduces the storage requirements for nodes as well as to make it easier for new nodes to join the network.

In stateful blockchains, a node has to store the explicit blockchain state which can be constructed from processing blocks in their respective orders. Whenever a new node joins the network, the new node has to synchronize its state with the rest of the network by fetching the latest state from existing nodes. The state could potentially be very large, making this synchronization process time consuming. Further, as the state gets larger, some nodes might leave the network as they cannot keep up with the storage requirements.

With stateless blockchains, nodes only have to maintain an accumulator over the blockchain state rather than explicitly maintaining the state itself. Given the size of the accumulator is very small (e.g., only a single group element with RSA accumulators [15]), this effectively alleviates the storage problem of nodes. Further, it is sufficient for a new node to get only the latest accumulator before it can participate in the network.

A trade-off in this model is increased transaction size. Each transaction can carry a membership proof for each of its inputs which attests that the input is contained within the accumulator (e.g., it is unspent). To generate such proofs, clients have to know the explicit blockchain state. To do so, they can either listen to the network for block broadcasts and maintain a copy by themselves, or rely on a semi-trusted entity that maintains a full copy of the state on behalf of the client and is always available.

For example, consider a UTXO-based blockchain with a UTXO set U at some point in time. At this time, validators only have the accumulator computed over U. Clients, on the other hand, know U explicitly and submit transactions with membership proofs on their inputs generated with respect to U. Suppose that a validator node P is selected by the network to propose the next block. P selects a block of transactions from its memory, verifies their membership proofs with respect to U, and updates the accumulator accordingly. It then broadcasts the explicit block as well as the latest accumulator state. Other validators who receive this block verify the accumulator state by processing transactions contained in the block, update their accumulators, and simply discard the block contents.

II. Introduction

One of the major barriers to the mass adoption of cryptocurrencies and blockchain protocols is their scalability limitations, primarily reflected by the rate at which they can process interactions. This is mainly imposed by the need for replicating data among many geographically-scattered nodes to increase resiliency to both faults and centralized manipulations.

Several scalability approaches have been proposed which generally fall into two categories: on-chain and off-chain scalability. The on-chain approach aims to improve scalability, typically by improving the underlying consensus mechanism, adding extra trust assumptions, and/or delegating the processing task to only a small subsets of (validator) nodes (e.g., committees or shards). The off-chain approach minimizes the use of the blockchain itself by allowing parties to transact via direct, point-to-point communication, and interact with the blockchain only occasionally to settle disputes or withdraw funds.

Both scaling approaches have seen progress; however, on-chain scaling is lagging behind by at least 1-2 orders of magnitude. On the other hand, off-chain mechanisms achieve better scalability only by imposing certain limitations such as collateral deposits and/or targeting high-frequency, low-value transactions, as in micropayments [1]. For applications that require instant settlement of high-liability, high-value interactions, such as real-time payments [2], on-chain scaling is more applicable and can achieve higher interaction throughputs. Furthermore, on-chain scaling is still necessary for widespread adoption of off-chain channels as opening and closing these channels still involve on-chain interactions whose rate depends on how frequent users need to dispute transactions, "cash-out" their money, or increase the capacity of their channels.

Slower progress in on-chain scaling is primarily due to the quadratic overhead of replication of the transaction ledger across the nodes. There has been recently significant progress in blockchain sharding mechanisms [3], [4], [5]. In these protocols, members of each network shard run a Byzantine fault tolerant (BFT) state-machine replication (SMR) protocol to build their local blockchain. As new nodes join the system, new shards are created and hence, the throughput of the system increases linearly with the size of the system.

Existing sharding protocols sample their shards in a way such that all shards satisfy the two properties of SMR: safety and liveness. Safety ensures that all honest nodes within a network shard maintain the same state, while liveness guarantees that a network shard processes (valid) transactions that are assigned to it. To achieve both liveness and safety in a network shard, the fraction of corrupt nodes in the network shard has to be less than a constant that depends on the underlying network assumptions: it is known that achieving both liveness and safety within a network shard is not possible if the fraction of corrupt nodes exceeds ½ in synchronous networks and ⅓ in partially synchronous networks [6].

Embodiments described herein consider the safety and liveness properties of SMR separately to show that, even if relatively small shards are sampled, safety can be ensured for all network shards and liveness can be ensured for some network shards. In such a setting, the protocol is safe (formalized in Theorem 4), as all shards are safe, and live (formalized in Theorem 5), as some shards process transactions. Embodiments achieve such a setting by adjusting a quorum size parameter of SMR, which can be a minimum number of honest nodes required to ensure both safety and liveness properties.

Embodiments can a set quorum size parameter q to a value such that the probability of having q or more corrupt nodes in a network shard is sufficiently low, and the probability of having q or more honest nodes is sufficiently high. Due to that, with high probability, embodiments end up with network shards where some of them have q or more honest nodes and all of them have strictly less than q corrupt nodes. Network shards that have q or more honest nodes are referred to as super-honest shards, whereas network shards that have strictly less than q honest and q corrupt nodes are referred to as safe shards. By using an intra-shard SMR protocol that guarantees both liveness and safety for super-honest network shards, and only safety for safe network shards, embodiments ensure the safety and the liveness of the protocol.

A. Embodiments

A sharded blockchain protocol that can scale beyond the previous state-of-the-art in terms of transaction throughput and confirmation latency is described herein.

1. Adjustable Quorums

The notion of adjustable quorums by adjusting a quorum size q is introduced by embodiments in the context of sharded blockchain systems which utilize SMR within each network shard. Previous results sample their network shards such that all network shards satisfy both the liveness and the safety properties of SMR. The adjustable quorum technique allows the system to relax SMR properties by allowing some shards to satisfy only the safety properties. In return, adjustable quorums can shrinks the network shard sizes significantly. In some embodiments, the quorum value can be a predetermined value. For example, the value can be determined prior to broadcasting a new block for inclusion into the blockchain.

2. Sharded Blockchains with Adjustable Quorums

A sharded permissionless blockchain protocol that uses the adjustable quorums relaxation to improve its performance is developed. Embodiments improve the state-of-the-art both in the synchronous and the partially synchronous setting in terms of throughput and latency.

3. Lock-Free, Client-Driven, Cross-Shard Verification

A new cross-shard transaction verification protocol is described in a UTXO model that minimizes cross-shard communication via a client-driven verification protocol. Embodiments can remove the storage overhead of maintaining locks on transactions by avoiding strict atomicity. Still, embodiments can maintain consistency with an embedded rollback mechanism in case of atomicity failures. Finally, unlike previous sharding protocols as in [4] and [5], embodiments can be resilient to replay attacks [7] against the cross-shard protocol.

4. Stateless Blockchains in Sharded Setting

Various embodiments adapt a stateless blockchain model into the sharded setting. Embodiments can utilize the stateless blockchain to solve some unique problems that exists with respect to network shard processes. Embodiments can also provide for making the reconfiguration phase of sharded blockchains more efficient by significantly reducing the size of blockchain state.

B. Overview of Methods and Systems

In this section, an overview of embodiments is presented. Particularly, one embodiment can include adjustable quorums which allows a system to sample much smaller shards than existing blockchain sharding protocols (see Table 1). As demonstrated herein, this can be achieved without sacrificing the integrity of the system.

Consider N nodes connected via a peer-to-peer network (e.g., similar to that of Bitcoin [8]), where each node is connected to only a constant number of nodes. The nodes can communicate with each other by gossiping a message to either the entire network or within a subset (e.g., a network shard) of nodes. Embodiments proceed in fixed time periods, referred to as epochs. A first epoch can start by executing a one-time bootstrapping protocol that can allow all nodes to agree on a sequence of random bits (e.g., an epoch randomness). The epoch randomness can then be used by each node to learn (1) a random assignment of all nodes to network shards, and (2) the sequence of leaders who later drive the intra-shard SMR. Once the network shards are formed, the members of each network shard can run a synchronous BFT SMR protocol to construct a sequence of blocks of transactions (e.g., the blockchain). Further, in some embodiments, network shards can be periodically reconfigured by shuffling nodes across them to prevent an adaptive adversary from controlling a network shard.

As discussed herein, an SMR protocol can have the two properties of 1) safety and 2) liveness. In a non-sharded setting, it can be trivial to satisfy either only the safety or only the liveness property. For example, nodes can easily satisfy safety by doing nothing. Given that all nodes start on the same state, they cannot possibly end up in different states after doing nothing. To satisfy liveness, nodes can simply process each transaction locally, without caring about the states of other nodes. However, in this case, there is no consistent replication across the nodes. Relaxing either of these properties does not provide a useful protocol in a non-sharded setting.

On the contrary, embodiments show that relaxing liveness for some, but not all, network shards in a sharded setting can provide for multiple benefits. For example, suppose each network shard satisfies safety, but some do not satisfy liveness. Embodiments can guarantee the safety of the protocol as each network shard satisfies safety (as formalized in Theorem 4) and the protocol exhibits liveness as some network shards satisfy liveness (as formalized in Theorem 5). Although relaxing liveness on some shards may introduce additional challenges, such as handling the transactions that are routed to safe shards, embodiments can further solve these problems efficiently.

According to some embodiments, a benefit of relaxing liveness on some shards is to obtain smaller shards compared to previous works, while maintaining a similar failure probability. Due to smaller shards, embodiments provide higher throughput and lower confirmation latency. In FIG. 1, a plot illustrates a comparison of embodiments to Rapid-Chain under an example setting to demonstrate how relaxing liveness according to embodiments can shrink the network shard size, and consequently, improves the total number of network shards in the network. In FIG. 1, RapidChain and various embodiments are compared with a network of size N=2000 with F=33% resiliency. In this setting, each network shard of RapidChain ensures both safety and liveness up to 50% shard corruption, whereas each shard according to embodiments ensures liveness up to 30% corruption, and safety up to 70% corruption. Further, RapidChain creates 10 network shards of 200 nodes, where the failure probability of a network shard (e.g., the probability that a network shard does not satisfy safety) is $1.9 \cdot 10^{-7}$ for RapidChain. In contrast, embodiments can create 40 shards of 50 nodes in the same setting. Yet, the system according to embodiments ensures a network shard failure probability of $8.6 \cdot 10^{-8}$. Further, the probability of having a super-honest network shard is 0.37. This means that the expected number of super-honest network shards, which are both live and safe, is 14.8.

Furthermore, to relax the liveness property, embodiments can adjust the quorum size parameter q of intra-shard SMR by taking the network size N and the network resiliency F (e.g., maximum fraction of corrupt nodes assumed in the network) into account. For example, embodiments can set q to a value such that, in a network shard, the probability of having q or more corrupt nodes is sufficiently low, and the probability of having q or more honest nodes is sufficiently high. The network shards that have q or more honest nodes can be super-honest nodes, and the nodes that have strictly less than both q honest and q corrupt nodes are safe nodes. Embodiments can adjust q such that the system of node computers is in a setting that has only super-honest and safe shards with high probability. By utilizing an SMR protocol that guarantees both liveness and safety for super-honest shards, and only safety for safe shards, embodiments ensure safety and liveness of the network.

Additionally, embodiments can handle safe shards. As described herein, a safe shard may only ensure safety. In a safe shard, honest nodes always maintain the same state, but the network shard is not guaranteed to process interactions (e.g., in case corrupt nodes in it stay silent).

Embodiments can address this problem by utilizing the honest nodes within such network shards and a reference network shard. The reference network shard can be a distinguished, honest-majority shard that is tasked with periodically reconfiguring network shards (e.g., whereas other shards are tasked with processing interactions) as well as maintaining and updating various look-up tables. For example, the reference network shard can maintain two look-up tables: 1) a node-to-shard table that shows which node is assigned to which shard and 2) a interaction-to-shard table that specifies how interactions are assigned to network shards.

For example, let S be a safe network shard where the corrupt nodes in the network shard are assumed to stay silent. After a sufficiently long time, honest nodes in the network shard are going to detect the lack of liveness in S. The nodes can observe that they cannot process interactions, and they cannot replace a network shard leader node that fails to produce valid block proposals. After that time, they can generate and provide a complain message to the reference network shard. Upon receiving a sufficient number of complaints from S, the reference network shard can update the maintained look-up tables. For example, the reference network shard can reassign every node of S to a special symbol $\perp$ in the node-to-shard table (or other suitable identifier in the table), and reassigns interactions which were previously assigned to S to one of the active network shards in the interaction-to-shard table. Consequently, interactions are not going to be routed to S anymore, and (honest) nodes of S stop participating in intra-shard SMR. This effectively closes S for the ongoing epoch.

However, a technical challenge arises in the following case: assume corrupt nodes within S participate honestly until sometime before becoming silent. This case differs from the previous example, because the state of S (e.g., the UTXO set) is not empty. Suppose St takes over transactions of S due to reassignment. To process transactions on behalf of S, St has to know the latest state of S. In other words, the system needs to transfer the state across network shards whenever a network shard with non-empty UTXO set is closed. To do this efficiently, embodiments can utilize a stateless blockchain model which uses cryptographic accumulators to succinctly maintain the blockchain state.

III. Model and Problem Definition

This section describes a network model and threat model which may be described present in embodiments.

A. Network Model

Embodiments consider a peer-to-peer network with N nodes that establish identities (e.g., public/private keys) through a Sybil-resistant identity generation mechanism such as that of [16], which may require every node to solve a computationally-hard puzzle on their locally-generated identities (e.g., public keys) verified by all other nodes. Without loss of generality and similar to hybrid blockchain protocols [17], [18], [3], [4], embodiments can assume all participants in the consensus protocol have equivalent computational resources.

Further, embodiments can assume all messages sent in the network are authenticated with the sender's private key. The messages can be propagated through a synchronous gossip protocol [19] that guarantees that there is known upper bound $\Delta$ on the message delivery (e.g., when an honest node $r_1$ sends a message m to another honest node $r_2$ at time t, $r_2$ receives m by t+$\Delta$). However, the order of messages are not necessarily preserved (e.g., given $r_1$ first sends $m_1$ and then $m_2$, $r_2$ might receive $m_2$ before m). This may be similar to synchronous models adopted by permissionless protocols [3], [20], [4], [21].

B. Threat Model

Embodiments can consider a probabilistic polynomial-time Byzantine adversary who controls up to ⅓ of the nodes at any time. The corrupt nodes may not only collude with each other, but can also deviate from the protocol in an arbitrary manner (e.g., by sending invalid or inconsistent messages, by remaining silent, etc.). Similar to various sharded protocols [17], [22], [18], [4], [21], the adversary can be an epoch adaptive adversary (e.g., slowly adaptive adversary). The adversary can select the set of corrupt nodes at the beginning of the protocol and/or between each epoch but cannot change this set within an epoch (e.g., the adversary cannot choose which node to corrupt after nodes are shuffled between shards). Nodes may disconnect from the network during an epoch or between two epochs for any reason (e.g., due to internal failure or network failure). However, at any moment, at least an ⅔ of the computational resources belong to honest participants that are online (e.g., respond within the network time bound). Additionally, various embodiments do not rely on any public-key infrastructure or any secure broadcast channel, but can assume the existence of a random oracle needed for collision-resistant hash function.

C. Problem Definition and Properties

A set of transactions can be assumed to be sent to the network of node computers by a set of clients (e.g., thin clients on client devices, etc.) that may be external to block verification process and may not belong to a network shard. Nodes in the network can batch interactions into blocks and commit them by an intra-shard SMR protocol. A network shard commits to a block if every honest node within the network shard commits to the block. A network shard commits to an interaction if the network shard commits a block containing the transaction. Various embodiments can have the following properties:

Intra-shard Safety. If S is a safe or a super-honest shard, and if an honest node in S commits a block $B_k$ at height-k, then every honest node in S eventually commit $B_k$ at height-k.

Intra-shard Liveness. When a user submits a valid transaction T to a super-honest shard S, T is eventually committed by S.

Provable Commits. Every committed block $B_k$ of a network shard S carries a commit-proof $COM_{B_k S}$ which attests that $B_k$ is committed by S.

Inter-shard Safety. Once a network shard commits a transaction T, no shard can commit to a transaction T' such that T and T' conflict.

Inter-shard Liveness. When a user submits a valid transaction T to a network shard S, either S commits T or S is closed and another shard S' commits T.

Scalability

IV. Systems

Figure 2:
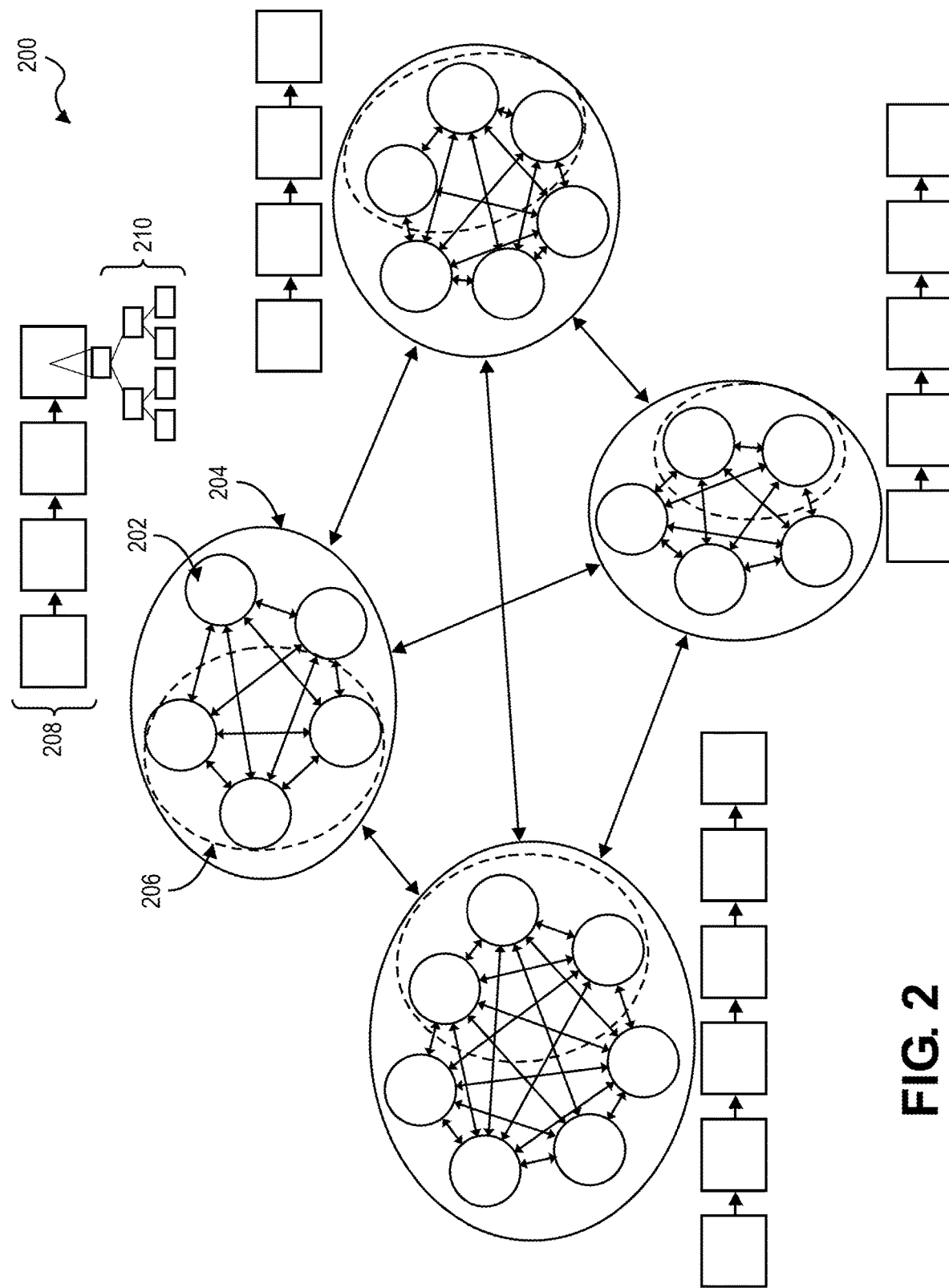
FIG. 2 shows a blockchain system according to embodiments.

FIG. 2 shows a system 200 according to embodiments. The system 200 can comprise a plurality of nodes (e.g., node computers). For example, the plurality of nodes can include the node 202. The nodes of the plurality of nodes may be grouped into computing groups. In some embodiments, a group of nodes can be a network shard. For example, the node 202 as well as four other nodes may be in the network shard 204. Each shard may have a quorum of nodes. For example, the network shard 204 can have a quorum 206. The quorum 206 can include three of the 5 nodes in the network shard 204. The quorum 206 may not always be the particular three nodes as indicated in FIG. 2. Rather, the quorum 206 may be a number of nodes which may be needed to create new blocks for a blockchain (e.g., the blockchain 208) maintained by the network shard 204. The nodes of the network shard 204 can maintain the blockchain 208. Each block of the blockchain 208 can include a plurality of interactions 210 which may be hashed together (e.g., in a Merkle tree to form a Merkle root). In some embodiments, each shard may maintain a different blockchain. Additionally, in some embodiments, each blockchain of each group of nodes (e.g., the network shard 204) may also referred to as a network shard.

In some embodiments, a plurality of node computers in a network shard are a first plurality of node computers in a first network shard maintaining a blockchain which is a first blockchain, and associated with a first quorum value. A second plurality of node computers in a second network shard maintaining a second blockchain is associated with a second quorum value may also be present in the system. Each node in each network shard may be capable of communicating with every other node in the system directly or indirectly.

For simplicity of illustration, a certain number and set of components are shown in FIG. 2. It is understood, however, that embodiments of the invention may include more than one of each component. In addition, some embodiments of the invention may include fewer than or greater than all of the components shown in FIG. 2.

Messages between the devices in FIG. 2 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

Figure 3A:
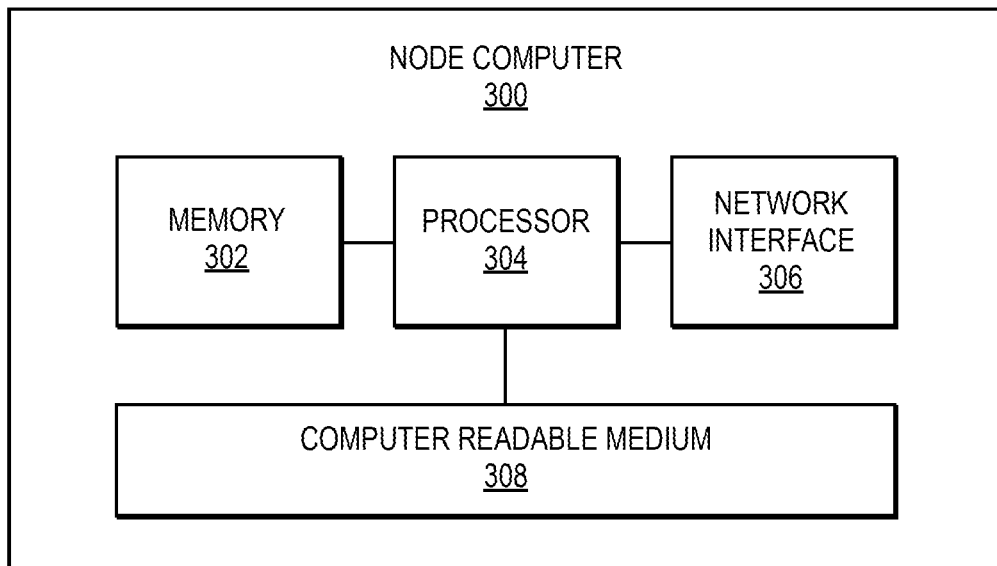
FIG. 3A shows a node computer according to embodiments.

FIG. 3A shows a block diagram of a node computer 300 according to embodiments. The exemplary node computer 300 may comprise a processor 304. The processor 304 may be coupled to a memory 302, a network interface 306, and a computer readable medium 308. The computer readable medium 308 can comprise any suitable number of modules.

The memory 302 can be used to store data and code. The memory 302 may be coupled to the processor 304 internally or externally (e.g., cloud based data storage), and may comprise any combination of volatile and/or non-volatile memory, such as RAM, DRAM, ROM, flash, or any other suitable memory device.

The computer readable medium 308 may comprise code, executable by the processor 304, for performing a method comprising: broadcasting, by a node computer, a propose message comprising a new block for a blockchain to a plurality of node computers in a network shard; receiving, by the node computer, at least one vote message from the plurality of node computers, the at least one vote message indicating verification of the new block; after a predetermined amount of time, receiving, by the node computer, a plurality of pre-commit messages comprising at least the new block and a block certificate created based on the at least one vote message; and if the number of received pre-commit messages of the plurality of pre-commit messages is greater than a quorum value associated with the network shard, committing, by the node computer, the new block to the blockchain.

The network interface 306 may include an interface that can allow the node computer 300 to communicate with external computers. The network interface 306 may enable the node computer 300 to communicate data to and from another device (e.g., other node computers of a plurality of nodes, etc.). Some examples of the network interface 306 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3B:
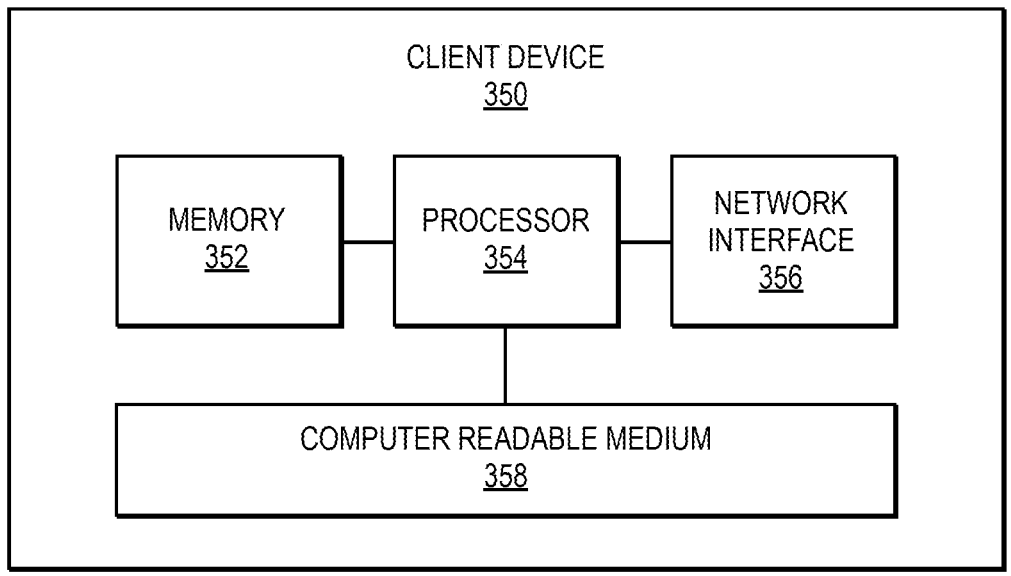
FIG. 3B shows a client device according to embodiments.

FIG. 3B shows a block diagram of a client device 350 according to embodiments. The exemplary client device 350 may comprise a processor 354. The processor 354 may be coupled to a memory 352, a network interface 356, and a computer readable medium 358. The computer readable medium 358 can comprise any suitable number of modules.

The memory 352 can be used to store data and code. The memory 352 may be coupled to the processor 354 internally or externally (e.g., cloud based data storage), and may comprise any combination of volatile and/or non-volatile memory, such as RAM, DRAM, ROM, flash, or any other suitable memory device.

The computer readable medium 358 may comprise code, executable by the processor 354, for performing a method comprising: providing, by a client device, a first proof request comprising a request for a first proof-of-inclusion from a first shard maintaining a first blockchain; receiving, by the client device, the first proof-of-inclusion from a first node computer of the first network shard; providing, by the client device, a second proof request comprising a request for a second proof-of-inclusion from a second shard maintaining a second blockchain; receiving, by the client device, the second proof-of-inclusion from a second node computer of the second network shard; generating, by the client device, a commit interaction request message comprising interaction data and the first proof-of-inclusion and the second proof-of-inclusion; and providing, by the client device, the commit interaction request message to a third shard maintaining a third blockchain, wherein a third node computer of the third shard verifies the first proof-of-inclusion and the second proof-of-inclusion and if the first proof-of-inclusion and the second proof-of-inclusion are valid, includes at least the interaction data in a new block of the third blockchain.

The network interface 356 can be similar to the network interface 306 and the description thereof need not be repeated here.

V. Methods

An SMR protocol may have several properties including safety, liveness, termination, and external provability. Safety can include if a block is committed by any honest node at a position, every honest node eventually commits that block at the same position. Liveness can include each client request is eventually committed by all honest nodes. External provability can be present if some correct node decides v with proof $\pi$, and all correct nodes can verify that v is the decision using $\pi$.

In some embodiments, a method may include broadcasting, by a node computer, a propose message comprising a new block for a blockchain to a plurality of node computers in a network shard. The node computer can receive at least one vote message from the plurality of node computers, the at least one vote message indicating verification of the new block. The node computer can, after a predetermined amount of time, receive a plurality of pre-commit messages comprising at least the new block and a block certificate created based on the at least one vote message. If the number of received pre-commit messages of the plurality of pre-commit messages is greater than a quorum value associated with the network shard, the node computer can commit the new block to the blockchain.

A. Adjusting the Quorum Size

Adjustment of the quorum size parameter will be discussed, particularly, in regards to how the quorum size parameter of the intra-shard SMR protocol helps embodiments reduce the sizes of network shards while still maintaining a failure probability.

The network size (e.g., number of node computers in the network) is denoted by N, the network resiliency is denoted by F, the number of maximum possible corrupt nodes is denoted by T=[N·F], and the network shard size is denoted by n. S can denote a network shard. Then, a number of honest nodes in the network shard S is a random variable $H_S$ and a number of corrupt nodes in the network shard S is a random variable $C_S$, where $n=H_S+C_S$. The quorum size parameter of the intra-shard SMR is denoted by q. The quorum size q can be greater than half of the number of nodes in the network shard n (e.g., q>n/2). Based on the above definitions, three different types of network shards can be created: 1) a network shard S is said to be super-honest if $H_S \geq q$, 2) a network shard S is said to be super-corrupt if $C_S \geq q$, and 3) a network shard S is said to be safe if it is neither super-honest nor super-corrupt (e.g., $H_S < q$ and $C_S < q$).

Assuming nodes are uniformly distributed to the network shards, the probability of an arbitrary shard S being super-honest via hypergeometric distribution is:

$$Pr[S \text{ is super-honest}] = Pr[H_S \geq q] = \sum_{i=q}^{n} \frac{\binom{T}{n-i}\binom{N-T}{i}}{\binom{N}{n}} \quad (1)$$

The probability of S being super-corrupt is:

$$Pr[S \text{ is super-corrupt}] = Pr[C_S \geq q] = \sum_{i=q}^{n} \frac{\binom{T}{i}\binom{N-T}{n-i}}{\binom{N}{n}} \quad (2)$$

The probability of S being a safe shard is:

$$Pr[S \text{ is safe}] = (Pr[S \text{ is super-corrupt}] + Pr[S \text{ is super-honest}]) \quad (3)$$

Given that in various embodiments, the intra-shard SMR does not ensure safety for a super-corrupt shard, to ensure the safety of the protocol, the probability of sampling a super-corrupt shard should be sufficiently small. As such, under a given network size N and resiliency F, values for the network shard size n and quorum size q can be determined that provide a sufficiently small probability of sampling a super-corrupt shard, and that further provide a sufficiently large probability of sampling a super-honest shard. Sufficiently large and sufficiently small probabilities can be of any suitable size and can be application specific (e.g., one can define them as being negligible/non-negligible with respect to a security parameter). In the analysis herein, a goal is to demonstrate that various embodiments improve upon the state of the art, including RapidChain [5]. For example, for a given network size N and resiliency F, it can be demonstrated that embodiments may have at least an expected time-to-failure comparable to that of Rapid-Chain's, and meanwhile, show that embodiments have more super-honest network shards than the number of network shards in RapidChain (e.g., because all shards satisfy liveness in RapidChain).

Next, the time-to-failure and the performance of embodiments with RapidChain under a network size of N=2000 and resiliency of F=33% will be discussed. The analysis is then extended to the setting with a network size of N=4000 and a resiliency of F=33%. These are the settings that were analyzed by the authors of RapidChain. The results are summarized in Table 1, below. Table 1 illustrates the comparison of embodiments with RapidChain in terms of expected time-to-failure and expected number of active shards. An epoch duration of 24 hours is assumed for both protocols when calculating the expected time-to-failure.

TABLE 1

Comparison of embodiments with RapidChain

| Protocol | Network Size | Network Resiliency | Shard Size | Shard Resiliency | Expected Time-to-Failure | Expected Number of Active Shards |
|---|---|---|---|---|---|---|
| RapidChain [5] | 2,000 | 33% | 200 | 50% | 1,412 years | 9 |
| RapidChain [5] | 4,000 | 33% | 250 | 50% | 4,580 years | 15 |
| Embodiments | 2,000 | 33% | 50 | 70% | 800 years | 13.3 |
| Embodiments | 4,000 | 33% | 80 | 65% | 11,165 years | 31.6 |

As noted in Table 1, in Embodiments, a network size of 4,000 nodes and can have an expected time-to-failure of 11,165 years, and 31.6 active shards. The time-to-failure is advantageously higher than the RapidChain protocol with the same number of nodes. Further, the number of active shards is also higher in embodiments, than in the RapidChain protocol, thus advantageously resulting in faster inter-action processing. Still further, the shard resiliency value can be higher than in RapidChain, thus making embodiments more robust than the RapidChain protocol.

Figure 12:
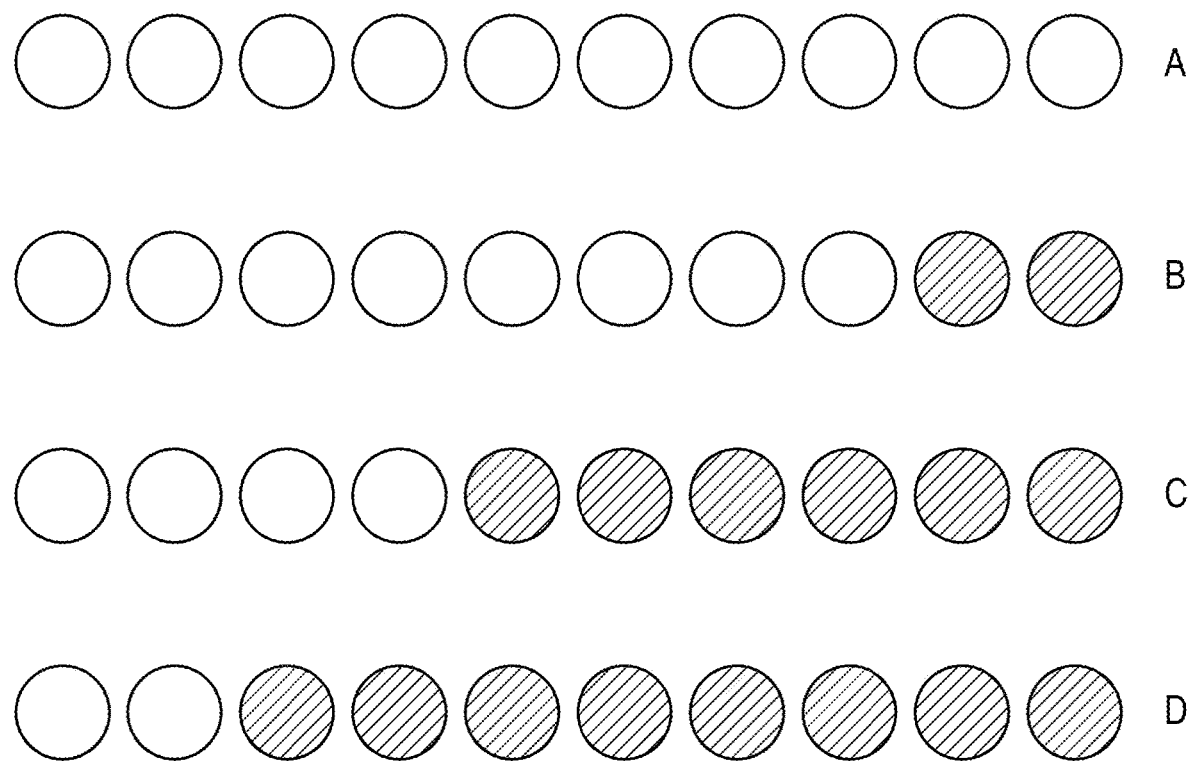
FIG. 12 shows an illustration of four network shards according to embodiments.

As a simple illustration, FIG. 12 shows four network shards, A, B, C. and D, each of which contain 10 nodes, and have 0, 2, 6, and 8 corrupt nodes, respectively. Shards A and B would be both safe and live under both the Rapidchain protocol and embodiments. Shard D would not be safe or live under either the RapidChain or embodiments of the invention. Shard C could cause the RapidChain protocol to fail (e.g., that fake or false interactions are recorded to a blockchain in any shard in the system). Shard C, however, would not cause embodiments to fail. As noted in the description below, and as illustrated in FIG. 1 and if the quorum value for the system is set to 70%, Shard C would be considered "safe," because a fake interaction would never be recorded to the blockchain on that shard. However, it would not be considered "live" since it would not be able to output any transactions onto its blockchain or broadcast that result to the other network shards. As explained below, embodiments of the invention can use a message protocol that can address the issue of a network shard that stays silent for too long. For example, as explained below, a reference network shard can receive a shutdown from the honest nodes in the silent network shard. Once this message is received, the silent network shard can be shut down and the nodes therein can be re-arranged or re-distributed to other network shards.

In some embodiments, safety may be violated when there exists at least one super-corrupt shard. Whereas, the safety of RapidChain is violated when there exists at least one non-honest-majority shard. Thus, the failure probability of embodiments is the probability of obtaining at least one super-corrupt shard, and the failure probability of Rapid-Chain is the probability of obtaining at least one non-honest-majority shard. Since shards are sampled without replacement, Equations 1 and 2, above, give exact values only for the very first sampled shard. As is commonly done, embodiments report an upper-bound on the failure probability by using union-bound.

Figure 4:
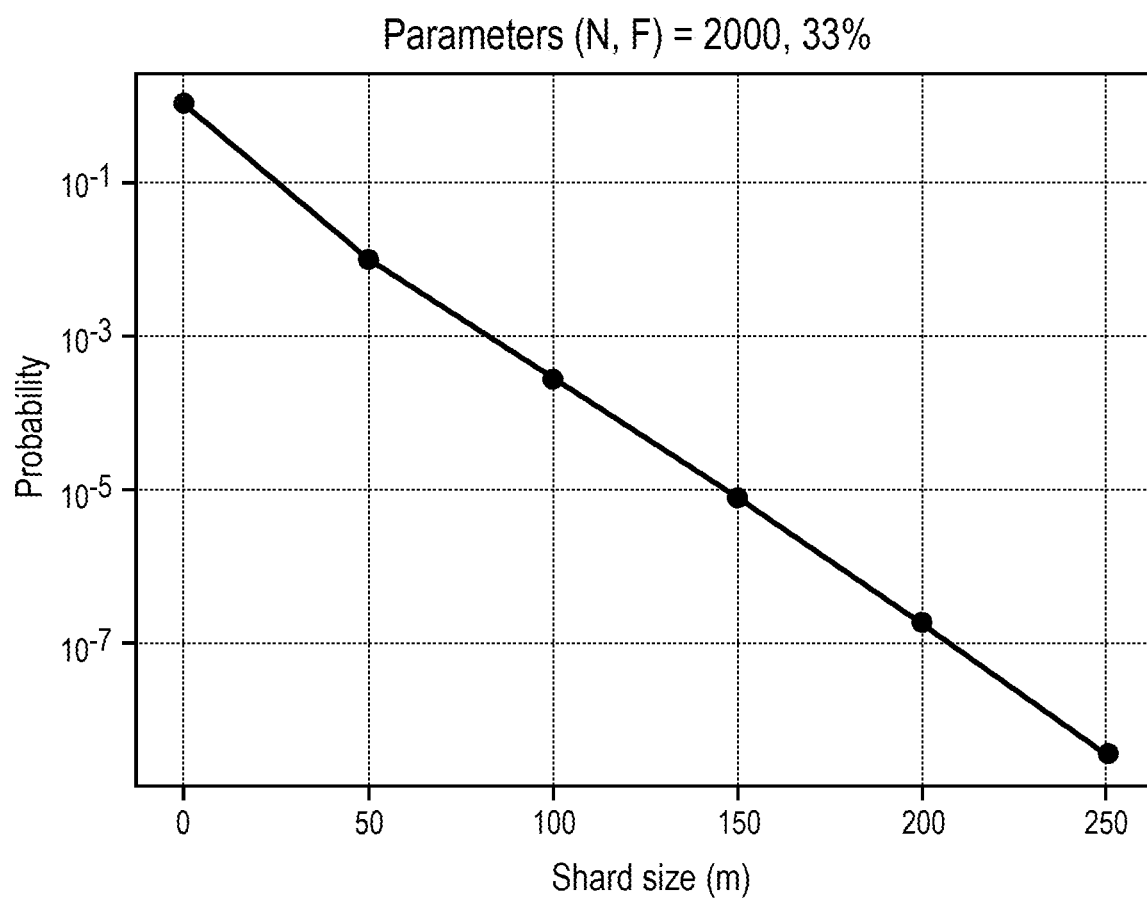
FIG. 4 shows a plot of probability of failure to sample a network shard from a network of size N=2000 with F=33% in RapidChain.
Figure 5:
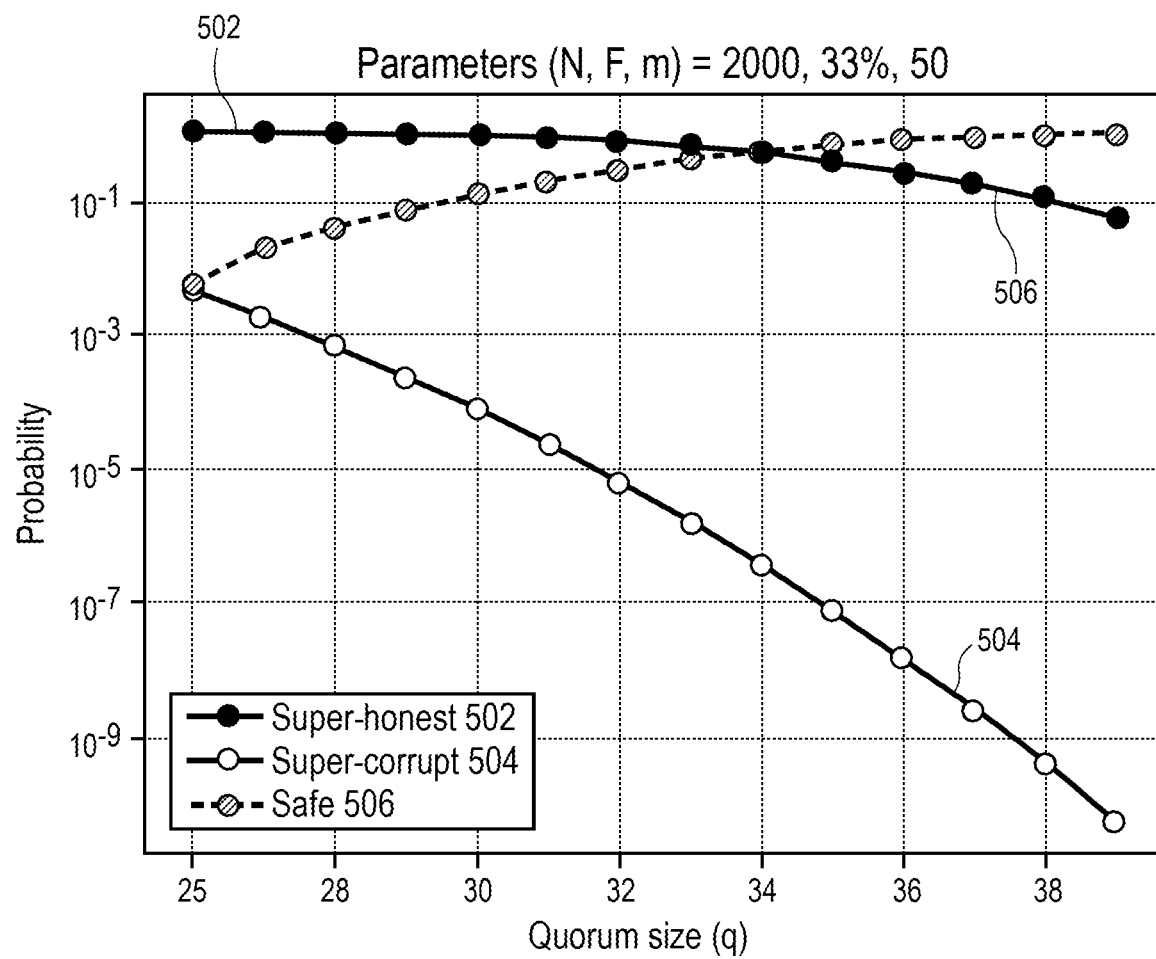
FIG. 5 shows a plot of probabilities to obtain different types of shards from a network of size N=2000 with F=33% according to embodiments.

FIG. 4 illustrates a probability of sampling a non-honest-majority shard from a network with N=2000 and F=33%. The probability of obtaining a non-honest-majority shard is about $1.94 \cdot 10^{-7}$ for n=200. FIG. 5 illustrates a probability of sampling different types of shards from a network with N=2000 and F=33%. After evaluating different values, various embodiments can utilize a network shard size of n=50 as an optimal shard size. However, any suitable shard size can be utilized and may be adjusted based on the number of node computers in the network, for example. The probability of obtaining a super-corrupt shard is about $8.57 \cdot 10^{-8}$ and the probability of obtaining a super-honest shard is about 0.37 when quorum size is q=35.

The authors of RapidChain report a network shard size of n=200 in the setting illustrated in FIG. 4. In FIG. 4, the probability of sampling a non-honest-majority shard is initially $1.94 \cdot 10^{-7}$ when n=200. The failure probability for RapidChain in this setting can be upper-bound as $2000/200 \cdot 1.94 \cdot 10^{-7} = 1.94 \cdot 10^{-6}$. Assuming an epoch duration of 24 hours, this gives a time-to-failure of roughly 1,412 years. Similarly, the probability of obtaining a super-corrupt shard is initially $8.57 \cdot 10^{-8}$ with n=50 and q=35 for embodiments as illustrated in FIG. 5. Thus, we can upper bound the failure probability for embodiments in this setting as $2000/50 \cdot 8.57 \cdot 10^{-8} = 3.42 \cdot 10^{-6}$. This gives a time-to-failure of roughly 800 years with an epoch duration of 24 hour.

The performance of embodiments and RapidChain in the above noted systems can be evaluated by examining the active number shards that are guaranteed to process transactions (e.g., shards that ensure liveness). Embodiments and Rapidchain can both include a network reference shard that includes, for example, 200 node computers. Excluding the reference network shard, RapidChain has 1800/200=9 active shards. For embodiments, the number of expected active shards is $1800/50 \cdot 0.37 = 13.3$ by the linearity of expectation.

Further, RapidChain cannot make up for this difference by reducing RapidChain's time-to-failure. Even reducing the network shard size in RapidChain from 200 to 190 gives RapidChain a time-to-failure of about 600 years, lower than embodiments. Various embodiments provide for the advantage of scaling better and has both higher time-to-failure and more active shards for particular system parameters than previous works.

B. Intra-Shard Key Generation

After nodes are assigned to shards, each shard can internally run a distributed key generation (DKG) algorithm such as of [23]. A goal is to utilize a threshold signature scheme (e.g., threshold BLS [24]) to minimize communication complexity. Shards that successfully complete this step can be authenticated by the reference network shard, and only the authenticated shards may be allowed to process interactions in the upcoming epoch.

Specifically, after running a DKG protocol, a network shard S generates a key-pair $sk_S$-$pk_S$ such that, $pk_S$ is a network shard-wise shared public key, where a hash digest of $H(pk_S)$ can be the network shard's identity and the $sk_S$ is the corresponding secret key which is verifiably q-out-of-n shared among the nodes of S. After this step, each node r of S generates a signature share $\sigma_r(H(pk_S))$ on the node's shard's identity using the node's share of the secret key. Then, every node sends their share of the signature to the reference network shard. After accumulating enough of these shares, the reference network shard constructs the threshold signature and verifies it with $pk_S$.

If the verification passes, the reference network shard adds S to the interaction-to-shard table by assigning S to its share of interactions (e.g., transactions). This table is committed and broadcast to the network by the reference network shard. Completion of this phase indicates the start of the epoch. For example, upon receiving this table, every shard starts to process transactions to which they are assigned.

It is possible for corrupt nodes in a safe shard S' to stall the DKG protocol (e.g., by staying silent). However, in this case, S' is excluded from the interaction-to-shard table, and every node of it is assigned to $\perp$ in the node-to-shard assignment table. This indicates that, transactions are not routed to S', and (honest) nodes within S' do not participate in intra-shard SMR in the upcoming epoch. This effectively closes S' until the next reconfiguration phase.

C. Assigning Interactions to Shards

When assigning new interactions to shards, there are two factors to consider: 1) the system must ensure that every interaction is uniquely assigned to a network shard to maintain consistency, and 2) the system should take load-balancing into account while doing so.

The reference network shard is tasked with maintaining and updating the interaction-to-shard table. Node computers receive this table from the reference network shard at the beginning of each epoch and do look-ups on it to determine whether an interaction is assigned to the network shard that the node is located within or assigned to a different shard. The interaction-to-shard table can be implemented as a complete binary search tree. The network shard identifiers can be at the leafs of the binary search tree, while the path from the root to a leaf specifies the prefix of the hashes of interactions that the network shard is assigned. For example, if the path from the root to a network shard S is 00, S processes interactions whose first 2 bits are 00. As new network shards are created or the existing ones are closed, the reference network shard can organize the tree accordingly and can broadcast the updated table to the network.

Figure 6:
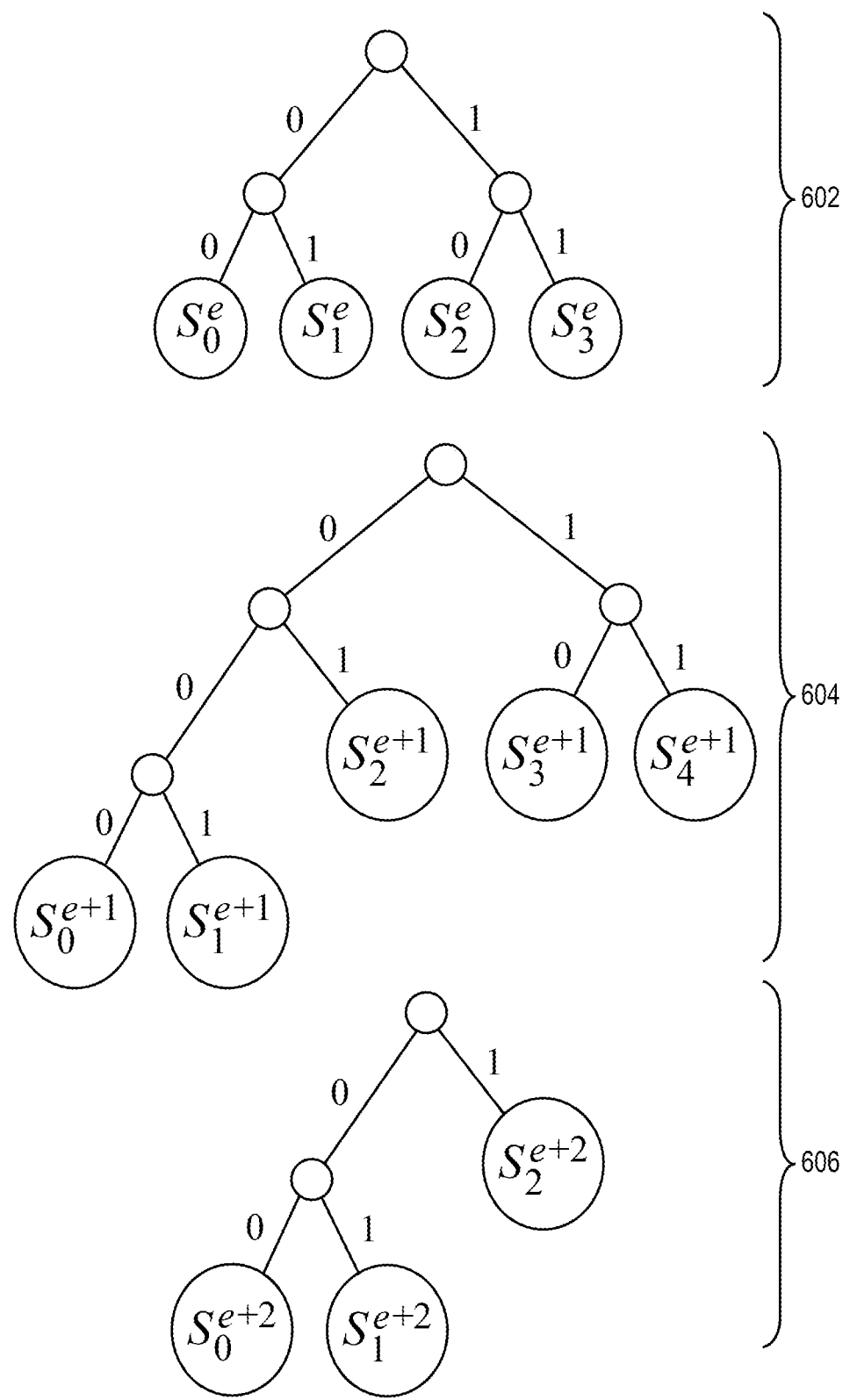
FIG. 6 illustrates reorganization of an interaction-to-shard table as node computers join and/or leave.

FIG. 6 illustrates reorganization of an interaction-to-shard table as node computers join and/or leave. In epoch e, the first network 602 includes 4 shards: $S_0^e$, $S_1^e$, $S_2^e$, and $S_3^e$. New nodes join the network between epoch e and e+1, and consequently, the network is split between 5 shards in epoch e+1. The tree is reorganized accordingly into the second network 604. Finally, some nodes leave the network and the network is sharded between 3 shards in epoch e+2. The tree is reorganized again into the third network 606.

D. Intra-Shard SMR

An intra-shard SMR protocol will be discussed next. A goal of the intra-shard SMR according to various embodiments is to satisfy safety for safe shards and satisfy both safety and liveness for super-honest shards. Prior to discussing the protocol, the block structure will be illustrated.

A block $B_k$ at height k is a tuple consisting of a header $B_k^h$ and a body $B_k^b$ given by, $$B_k := (B_k^h, B_k^b)$$

The body of the block contains a set of interactions that can be organized as a Merkle tree. The header of the block can be a tuple, $$B_k^h := (k, e, A^{UTXO}, H^{MT}, H(B_{k-1}), H(pk_S)),$$

where k is the height of the block, e is the epoch in which the block is created, $A^{UTXO}$ is an accumulator over the latest UTXO state, $H^{MT}$ is the root of the Merkle tree of transactions, $H(B_{k-1})$ is the digest of the previous block's header, and $H(pk_S)$ is the identity of the network shard that created the block. Due to the stateless blockchain model, after committing a block, nodes can discard the body of the block. The nodes may only maintain the latest block header along with its a commit-certificate of the block. As explained below, a commit certificate on the block header can attest that the corresponding block is committed to the blockchain.

Embodiments can proceed in two phases: 1) a steady-state phase and 2) a view-change phase. The steady-state phase can proceed in iterations, where in each iteration a current leader node computer of the network shard proposes blocks to the rest of the network shard. If the leader node computer behaves maliciously during steady-state, by either proposing equivocating blocks or by not proposing any block at all, the other nodes in the network shard can execute a view-change protocol to replace the corrupt leader, and then fall back to the steady-state. The explicit description of steady-state and view-change can be seen in below in Pseudocode 1 and Pseudocode 2.

---

Pseudocode 1: The steady state phase of intra-shard SMR

---

Let v be the current view number and let node L be the leader of the current view.
1. Propose. The leader L broadcasts
   $\langle \text{propose}, \langle B_k \rangle_L, BC(B_k - 1), v \rangle_L$.
2. Vote. Upon receiving the first valid
   height-k block $\langle B_k \rangle_L$ from L or through a
   vote by some other node, set precommit-
   timer$_k$ to 2Δ and broadcast a vote
   in form $\langle \text{vote}, \langle B_k \rangle_L, v \rangle$.
3. Precommit. When commit-timer$_k$ reaches
   0, if no equivocation for height-k
   is detected and if $B_k$ has a block
   certificate BC($B_k$), broadcast
   $\langle \text{precommit}, \langle B_k \rangle_L, BC(B_k), v \rangle$.
4. Commit. Upon receiving q $\langle$precommit,
   $\langle B_k \rangle_L, BC(B_k), v \rangle$ messages such
   that they all contain a valid block
   certificate BC($B_k$) for $B_k$, if $B_k$ is not
   already committed, commit $B_k$ and all
   of its ancestors. Further, broadcast q
   received precommit messages which
   constitute a commit-certificate CC($B_k$)
   for $B_k$.

---

Pseudocode 2: The view-change phase of intra-shard SMR

---

Let L and L' be the leader of view v and v + 1, respectively.
1. Blame. If less than p blocks are received
   from L in (2p + 1)Δ time in view v,
   broadcast $\langle$blame, v$\rangle$. If more than one
   block is proposed by L at any height,
   broadcast $\langle$blame, v$\rangle$ and the two equivocated blocks.
2. Quit old view. Upon gathering q $\langle$blame, v$\rangle$
   messages, broadcast them and
   quit view v by aborting running precommit-
   timers and stop voting in view v.
3. Status. Wait for 2Δ time and enter view v + 1.
   Upon entering view v + 1, send
   a highest block with a valid block certificate
   to L' and transition back to steady
   state.

---

Formally, the properties ensured by the intra-shard SMR, according to embodiments, are illustrated in the following three theorems.

Theorem 1 (Intra-shard Safety). If S is a safe or a super-honest shard, and if an honest node in S commits a block $B_k$ at height-k, then every honest node in S eventually commit $B_k$ at height-k.

Theorem 2 (Intra-shard Liveness). When a user submits a valid transaction T to a super-honest shard S, T is eventually committed by S.

Theorem 3 (Provable Commits). Every committed block Bk of a network shard S carries a commit-proof $COM_{B_{k,S}}$ which attests that $B_k$ is committed by S.

Figure 7:
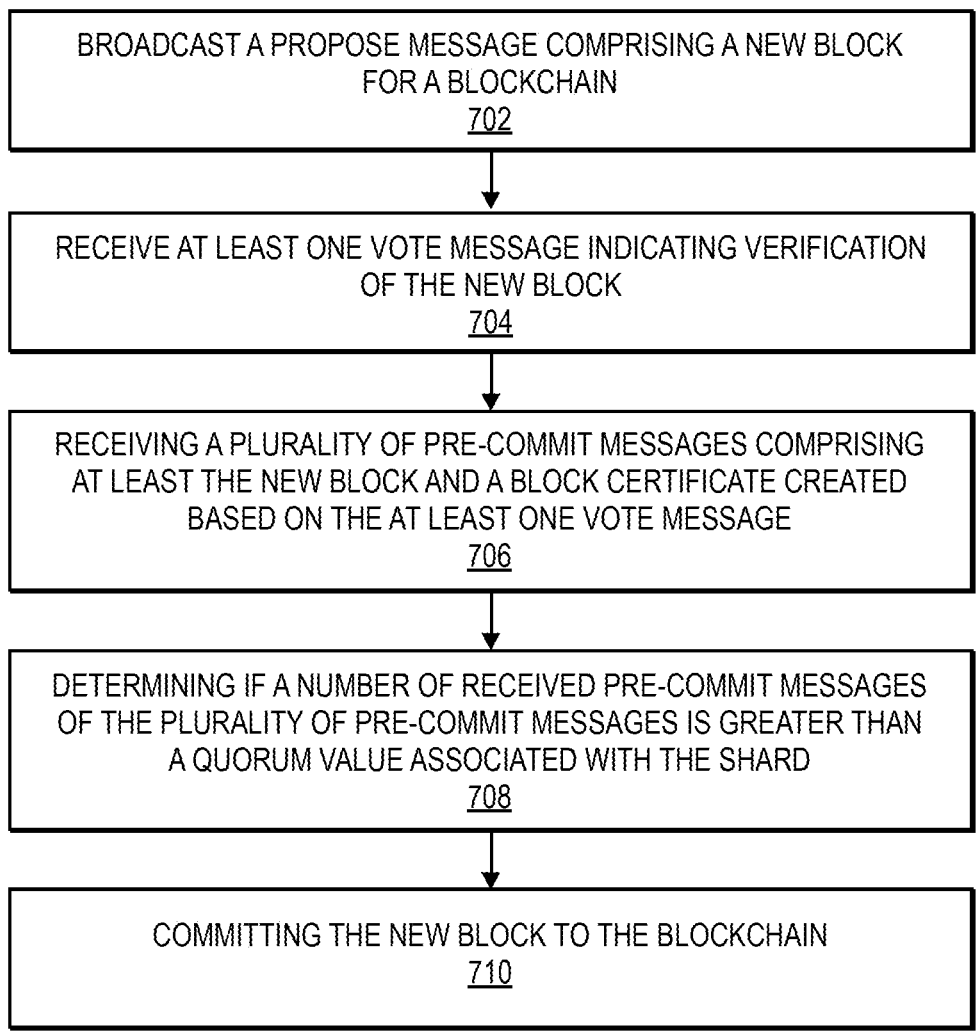
FIG. 7 shows a flowchart illustrating a block commitment method according to embodiments.

FIG. 7 shows a flowchart illustrating a block commitment method according to embodiments. The method illustrated in FIG. 7 may be performed by a node in a network shard. In some embodiments the node may be a leader node of the network shard.

Prior to step 702, the node computer can receive a commit interaction request message from a client device. The commit interaction request message can comprise interaction data and one or more proof-of-inclusions created by one or more network shards. The node computer can verify the one or more proof-of-inclusions as described in further detail in FIG. 7. If the proof-of-inclusions are valid, then the node computer can include the interaction data into a new block for the blockchain maintained by the network shard.

The node computer can generate the new block that can include the interaction data. The new block can comprise a block header and a block body. The block header can be a tuple comprising at least an accumulator value that accumulates available amounts (e.g., UTXOs). The block header can further include a block height, an epoch number, a root of a Merkle tree (e.g., a Merkle root), and a digest of a previous block header of a previous block in the blockchain. When generating the new block, in some embodiments, the node computer can determine the accumulator value using an accumulator over one or more latest amounts of the blockchain.

At step 702, the leader node (e.g., leader node computer) in the network shard can broadcast a propose message comprising the new block for a blockchain to a plurality of node computers in the network shard. The propose message can comprise the new block, a view number, and a previous block certificate. The view number can be a value associated with the current leader node. For example, if a first node is a leader node, then the view number may be 1.

The previous block certificate can include a data item that can act as evidence that the previous block was committed to the blockchain. In some embodiments, the previous block certificate can be a threshold signature that was generated based on individual signature shares from shares of a private key (e.g., shared through a network shard). For example, when the node computers of the shard sent a vote message to vote for the previous block to be included into the blockchain, the node computers signed the vote message's hash digest with the node computer's share of a secret key of the node computer's network shard. A quorum number of signatures on the vote message constitute a block certificate on the block.

Each node computer in the network shard can receive the propose message from the leader node computer. Each node computer in the network shard validates that the new block in the propose message is a correctly formed block (e.g., includes a correct hash value of the previous block, etc.). Furthermore, in some embodiments, each node computer can verify the previous block certificate prior to broadcasting the at least one vote message. For example, the previous block certificate can be formed by at least q commit messages broadcast by the node computers for the previous block.

If a node computer determines that the new block is valid, then the node computer can broadcast a vote message. The vote message can comprise the new block and the view number. When the node computer broadcasts the vote message, the node computer can set a timer (e.g., a precommit-time) to a predetermined time (e.g., $2\Delta$).

Whenever a node computer r sends a message m, the node computer signs its hash digest with the node computer's share of a secret key, denoted by $(m)_r$. We say q signature shares on the message m constitute a quorum-certificate for the message m. Specifically, a quorum-certificate is the threshold signature generated out of the individual shares. Depending on the contents of the message m, these certificates can be named differently: q vote messages on a block Bk can be referred to as a block certificate and is denoted by $BC(B_k)$. q pre-commit messages on a block Bk can be referred to as commit certificate, denoted by $CC(B_k)$. Finally, q blame messages on a view v can be referred to as view-change certificate and is denoted by VC(v).

At step 704, the leader node computer can receive at least one vote message from the plurality of node computers. The at least one vote message can indicate verification of the new block. For example, the other node computers can determine whether or not to verify the new block based on any suitable processing (e.g., verifying a proof of work).

At step 706, after a predetermined amount of time (e.g., the pre-commit-timer expires), the leader node computer can receive a plurality of pre-commit messages comprising at least the new block and a block certificate created based on the at least one vote message. The predetermined amount of time can allow each node to receive other nodes' votes or other messages, to determine if they want to pre-commit and send a pre-commit message. A quorum value q number of vote messages on the block can form a block certificate.

For example, when the timer (e.g., pre-commit-timer) at each node reaches zero, respectively each node computer in the network shard can determine if each received vote message (e.g., from receiving the vote broadcast of other node computers) includes the same view number and new block as the previously sent vote message. By doing, so the node computer can verify that there is no equivocation for the new block. Further, each node computer can verify if the new block has a block certificate created from a threshold number of votes. For example, a block certificate can be created from q number of votes on the block (e.g., utilizing signed hash digests signed with the node computer's share of a secret key). The node computer can then broadcast a pre-commit message including the new block, the block certificate, and the view number. Any number of node computers of the network shard can broadcast a pre-commit message.

At step 708, the leader node computer can determine if a number of received pre-commit messages of the plurality of pre-commit messages is greater than a quorum value q associated with the network shard. For example, the leader node computer can receive the pre-commit message broadcast by any suitable number of node computers of the network shard. Each pre-commit message can include the new block, the block certificate and the view number. The leader node computer can verify that at least the quorum value number of pre-commit messages include the same new block, the same block certificate, and the same view number.

At step 710, if a number of received pre-commit messages of the plurality of pre-commit messages is greater than a quorum value associated with the network shard, the leader node computer can commit the new block to the blockchain. In some embodiments, after committing the new block to the blockchain, the leader node computer can broadcast the plurality of pre-commit messages in a single broadcast message. The plurality of pre-commit messages can constitute a commit-certificate for the new block.

In some embodiments, after committing the new block to the blockchain, the node computer can remove the block body from a memory of the node computer. The block header can include the accumulator value that accumulates UTXOs. Therefore, the node computer can utilize the block header in future transactions and may not need to determine values from the block body. However, it is understood that other node computers in the network, that are not validator nodes may store the complete blockchain with all block headers and block bodies.

In some embodiments, the plurality of node computers in the network shard can be a first plurality of node computers in a first network shard maintaining the blockchain which can be a first blockchain. Further, the quorum value can be a first quorum value. A second plurality of node computers can be in a second network shard that may maintain a second blockchain which can be associated with a second quorum value. The quorum value and the number of node computers is a network shard can be of any suitable values consistent with the concepts described herein. In some embodiments, the plurality of node computers in the network shard can include, for example, 20 to 200 node computers, and the quorum value is in a range of 25 to 40. In some cases, the network shard sizes of 20-200 can provide sufficient interaction processing power while allowing the network as a whole to have many network shards to improve interaction throughput of the system. The quorum value range between 25-40 can provide a sufficient amount of safety to the network shards of the system. The above noted network shard size range and the quorum value range were found to be optimal ranges using an empirical experiment. Shard sizes within the 20 to 200 node computer range provide an optimum security and scalability.

In other embodiments, the node computer can, prior to broadcasting the propose message, receive a commit interaction request message from a client device (e.g., a laptop computer, a desktop computer, a smart phone, etc.). The commit interaction request message can comprise interaction data (e.g., UTXO data, etc.) and one or more proof-of-inclusions created by one or more shards. In some embodiments, at least one proof-of-inclusion of the one or more proof-of-inclusions may be created by the second network shard.

The node computer can then verify the one or more proof-of-inclusions in any suitable manner as described herein. If the one or more proof-of-inclusions are valid, then the node computer can include at least the interaction data in the new block as described in further detail in FIG. 8.

E. Safe Shard Detector

As discussed herein, safe shards lack liveliness. This means that interactions that are assigned to safe network shards are not guaranteed to be processed (e.g., in case corrupt nodes within them stay silent). To ensure such interactions are eventually processed, embodiments use the honest nodes in a safe network shard to detect the lack of liveness. Embodiments achieve this by augmenting each node with a safe shard detector, and by having them communicate with the reference network shard.

During an epoch, each node computer can monitor the state of the network shard of the node computer by running a safe shard detector whose specifications are provided in Pseudocode 3. The safe shard detector keeps track of events that could only happen in a safe shard. Once a node computer detects such an event, the node computer sends a shutdown message for the network shard of the node computer to the reference network shard.

Once the reference network shard receives n−q+1 shutdown message (e.g., a shutdown threshold) from a network shard $S_i$, the reference network shard updates the node-to-shard and interaction-to-shard tables: every node of $S_i$ is assigned to a symbol (e.g., "⊥") in node-to-shard table referred to as a null network shard (e.g., a network shard that has no presence in the network and does not process transactions) in a node-to-shard table for a present epoch. Further, the reference network shard assigns the interactions that were previously assigned to $S_i$ to one of the running shards $S_j$. The updated tables are broadcast to the network, and upon receiving the updated tables, the honest nodes of $S_i$ stop participating in intra-shard SMR for the current epoch. Further, nodes of $S_i$ request and receive the latest state of $S_j$ from the honest nodes in it. After receiving the latest state of $S_i$, $S_j$ start to process transactions on behalf of $S_i$ for the current epoch. Details of this process is further elaborated in Pseudocode 4.

For example, in some embodiments, the node computer can generate a shutdown message based on an inactivity timer associated with the first network shard. The inactivity timer can be a timer that is set locally by each node computer in a shard. The node computer can set the inactivity timer to a predetermined amount of time. For example, the inactivity timer can be set to a value of two times an upper bound on the message delivery time (e.g., 2Δ). The node computer can set the inactivity timer to the predetermined amount of time after performing an action to which the node computer expects a response. For example, the actions can include broadcasting a vote message, broadcasting a pre-commit message, etc.

For example, if the network shard that the node computer is operating within is a safe shard, as described herein, the network shard may not make any progress in creating new blocks for the blockchain. In this case, the node computer may generate a shutdown message which may include details regarding the lack of progress of the network shard (e.g., rates, times, etc.). The node computer can then transmit the shutdown message to the second plurality of node computers in the second network shard. In some embodiments, the second network shard can be a reference network shard. The reference network shard can determine to shutdown the first network shard and distributes the first plurality of node computers to a plurality of additional shards.

For example, one or more node computers in the reference network shard can receive one or more shutdown messages from a plurality of node computers. If a number of received shutdown messages of the one or more shutdown messages is greater than a shutdown threshold (e.g., n+g+1) associated with the network shard, then the reference network shard can assign each node computer of the plurality of node computers to a null network shard in a node-to-shard table for a present epoch. For example, A leader node computer in the reference network shard can further broadcast a propose table update message comprising the node-to-shard table to the plurality of node computers in the reference network shard. The leader node computer in the reference network shard can perform a commitment process, along with the other node computers of the reference network shard, to commit the reference network shard to the node-to-shard table. If the reference network shard commits to the node-to-shard table, then the node computers of the reference network shard can broadcast the node-to-shard table to the network. After receiving the node-to-shard table, the plurality of node computers of the shutdown network shard stop processing new blocks for the maintained blockchain. The reference network shard can then reassign new transactions from the shutdown network shard to an alternative network shard.

The safe-shard detector ensures the following properties:

Lemma 1. Safe shard detector keeps track of events that could only happen in a safe shard. Consequently, an honest node in a super-honest shard never sends a shutdown message, and thus, a super-honest shard is never closed.

Lemma 2. A safe shard either eventually processes transactions, or is eventually closed.

---

Pseudocode 3: Specifications of the safe shard detector.

Let r be an arbitrary honest node in a network
shard S whose current leader is L in view v.
   Vote inactivity. After voting for a block $B_k$,
   set inactivity-timer$_{vt}$ to 2Δ. Send a
   (close, S)$_r$ message to the reference network
   shard if none of the following
   happened when inactivity-timer$_{vt}$ is 0.
     An equivocation proof for L is received.
     A view-change certificate V C(v) is received.
     A block-certificate BC($B_k$) is received.
   Precommit inactivity. After broadcasting
   a precommit message for a block
   $B_k$, set inactivity-timer$_{pc}$ to 2Δ. Send a
   (close, S)$_r$ message to the reference
   network shard if none of the following
   happened when inactivity-timer$_{pc}$ is 0.
     An equivocation proof for L is received.
     A commit-certificate CC($B_k$) is received.
   Blame inactivity. After broadcasting an
   equivocation proof, set inactivity-
   timer$_{bl}$ to 2Δ. If a view-change certificate
   VC(v) is not received when
   inactivity-timer$_{bl}$ is 0, then send a
   (close, S)$_r$ message to the reference
   network shard.
   View-change inactivity. After quitting
   the view v, set inactivity-timer$_{vc}$ to
   6Δ. Send a (close, S)$_r$ message to the
   reference network shard if none of
   the following happened when inactivity-timer$_{vc}$ is 0.
     A valid block proposal is received.
     A view-change certificate V C(v + 1) is received.
   View-change bound. After doing n − q + 1
   view-changes, send a (close, S)$_r$
   message to the reference network shard.

---

Pseudocode 4: Steps of closing a network shard during an epoch.
This process can involve the reference network shard updating its node-to-shard and interaction-to-shard tables, and a state transfer from the closed shard to one of the active shards.

Let $L_R$ be the current leader of the reference network shard
$S_R$. Upon receiving n − q + 1 shutdown messages from the
nodes of a network shard $S_i$, $L_R$ initiates the following
protocol to close $S_i$ for the ongoing epoch and to enforce $S_i$
transfers its state to one of the active shards $S_j$.
   Updating the tables. $L_R$ updates node-to-shard table by
   assigning every member of $S_i$ to ⊥, and updates
   transaction-to- shard table by reorganizing the
   underlying tree structure after removing $S_i$. Suppose $S_j$
   is assigned to transactions which were previously
   assigned to $S_i$ due to this reorganization.

Pseudocode 4: Steps of closing a network shard during an epoch.
This process can involve the reference network shard updating
its node-to-shard and interaction-to-shard tables, and a state
transfer from the closed shard to one of the active shards.

Committing to the new tables. $L_R$ proposes updated tables
along with shutdown request to the reference shard.
Nodes of the reference shard runs an SMR protocol
to commit the proposal. Note that, since reference
shard is an honest-majority shard, they do not run
the protocol described herein, but rather an SMR
protocol that works under honest-majority.
Broadcasting the new tables. Once proposal is committed,
$L_R$ broadcasts the propose table update message to the
rest of the network which carries the new tables.
Closing the shard and state-transfer. Upon receiving the
proposal and verifying its correctness, nodes of $S_i$
stop to participate in the intra-shard SMR, and nodes
of $S_j$ request the latest state from nodes of $S_i$. Nodes
of $S_i$ reply to this request by sending their latest block
headers. After receiving the state of $S_i$, $S_j$ starts to
process transactions which were previously assigned to
$S_i$ by running an independent SMR instance along
with his running SMR instance(s).

F. Interaction Verification

Next, how interactions (e.g., transactions) are verified will be described. Each interaction can have a format and may be performed on a single-shard or cross-network shard. The discussion above relates to the ability of the network to decide on how transactions are written to blockchains on network shards and how network shards are managed. The discussion below relates to proving that a client can perform a transaction prior to one or more network shards including the transaction in a block.

1. Interaction Format

Various embodiments can utilize the UTXO model where an interaction contains a set of inputs and a set of outputs. For example, consider a transaction T with a single input I and a single output O, denoted as:

$$T := \langle I, O \rangle$$

The output can be an address-value pair, $O := (pk, v)$, indicating that v amount of currency should be sent to address pk. The input is a tuple denoted by, $$I := (O', sig, ME\, M_{\langle O', S \rangle})$$

where $O' := (ctr, pk', v')$ refers to an UTXO (e.g., an available amount), contained in the accumulator of some network shard S with ctr as its addition-order in the accumulator, and sig is a signature, valid under pk'. Further, $MEM\, M_{\langle O', S \rangle}$ is a membership-proof on O' with respect to $A_S^{UTXO}$, the latest UTXO accumulator state of S.

2. Single-Shard Verification

As described herein, a hash of a transaction can uniquely determine which network shard it is assigned to. As an example of a single network shard transaction verification, consider the transaction T from the previous paragraph. If the transaction T is assigned to the network shard S (e.g., determined based on the hash of the transaction T) where O' resides, then verification of transaction T can include: 1) verifying that the transaction T is assigned to the network shard S by doing a look-up on interactions-to-shard table, 2) verifying v'=v and validness of the signature sig under pk', and 3) verifying $MEM\, M_{\langle O', S \rangle}$ with respect to the accumulator $A_S^{UTXO}$. If the transaction T is verified, the network shard S can process the transaction T by including it in the next block, and consequently removing O' from the accumulator $Ar_S^{UTXO}$ and adding O (with an appropriate counter) to the accumulator $A_S^{UTXO}$.

3. Cross-Shard Verification

Cross-shard verification may be needed when two inputs and outputs of a transaction are located in different shards. Let the transaction $T := \langle \langle I_1, I_2 \rangle, O_3 \rangle$ and assume that UTXOs $O_1$ and $O_2$ (e.g., the outputs), referenced by $I_1$ and $I_2$ (e.g., the inputs), are contained in shards $S_1$ and $S_2$, respectively. Further, the transaction T can be assigned to shard $S_3$. Verification of the transaction T can requires a client device to execute a cross-shard verification protocol.

To create a valid cross-shard transaction, the client device can first request a proof-of-inclusion (PoI) from the inputs shards. A PoI attests that the output referenced by an input is removed from the UTXO of the network shard maintaining it. Specifically, the client device sends the transaction T (e.g., interaction data) to $S_1$ and $S_2$. The network shards $S_1$ and $S_2$: 1) first verify $I_1$ and $I_2$, 2) include (T, 1) and (T, 2) in their next block, and 3) remove $O_1$ and $O_2$ from $A_{S_1}^{UTXO}$ and $A_{S_2}^{UTXO}$, respectively. If $S_i$ is the network shard which removed the output referenced by $I_i$, the respective proof-of-inclusion (PoI) is denoted as, $$PO\, I_{\langle I_1, I_2 \rangle} = (M\, T_{\langle \langle T, i \rangle, B \rangle}, B^h, CO\, M_{\langle B, S_i \rangle})$$

where $MT_{\langle T, i \rangle B}$ is the Merkle-proof on (T, i) with respect to block B that contains (T, i), where i refers to which input of the transaction T is processed. Together with the header of block $B^h$, and the commitment proof on block CO $M_{\langle B, S_i \rangle}$ (e.g., a block commitment proof), one can verify (T, i) is committed by $S_i$, and consequently, $O_i$ is removed from shard's state. A block commitment proof can include information that proves that the associated block was included in the blockchain. The block commitment proof can be a proof showing that the block B is in the ledger of network shard $S_i$. Each block in the blockchain can include a solved hash from a parent (e.g., previous) block in the blockchain. The block commitment proof, in some embodiments, can include at least the solved hash from the parent block. Each new block includes the parent block's hash and thus ensures a chronological block order.

Depending on whether $I_1$, and $I_2$ are valid (e.g., they refer to valid UTXOs in their respective shards), there are three possible cases of how the transaction T can be processed, each of which are described below.

Both $I_1$ and $I_2$ are valid. $S_1$ and $S_2$ process the transaction T, so client obtains both $PO\, I_{\langle I_1, S_1 \rangle}$ and $PO\, I_{\langle I_2, S_2 \rangle}$. The client device then creates the commit transaction, $$T_{com} := (T, PO\, I_{\langle I_1, S_1 \rangle}, PO\, I_{\langle I_2, S_2 \rangle}),$$

and sends it to $S_3$. Upon receiving $T_{com}$, $S_3$ can first verifies $O_1 \cdot v_1 + O_2 \cdot v_2 = O_3 \cdot v_3$, and then verifies the PoIs. Verification of a $PO\, I_{\langle I_i, S_i \rangle}$ can include the following steps: 1) deducing $S_i$ from the block header $B^h$, 2) verifying CO $M_{\langle B, S_i \rangle}$ with identity of $S_i$, and 3) verifying the Merkle roof on (T, i) with respect to $B^h$. Given both $I_1$, and $I_2$ are valid, both PoIs are valid too. Thus, $S_3$ includes $T_{com}$ in the next block, and adds $O_3$ in $A_{S_1}^{UTXO}$.

Only one of $I_1$ and $I_2$ is valid. Without loss of generality, assume $I_1$ is valid and $I_2$ is not valid. In this case, the client device only receives $PoI_{\langle I_1, S_1 \rangle}$. This violates atomicity as only $O_1$ is removed. However, embodiments allow the client device to refund the amount of $O_1$ by sending, to $S_3$, a refund transaction to ensure consistency:

$$T_{ref} = (T, PoI_{\langle I_1, S_1 \rangle}),$$

to $S_3$. Upon receiving $T_{ref}$, $S_3$ verifies the only PoI, includes $T_{ref}$ in the next block, and adds $O'_3$ in $A_{S_3}^{UTXO}$ such that $O'_3 \sqrt{v'_3} = O_1 \cdot v_1$.

Both $I_1$ and $I_2$ are invalid. In this case, the client device does not receive any PoI, and hence, the client device cannot create any valid cross-shard transaction.

Figure 8:
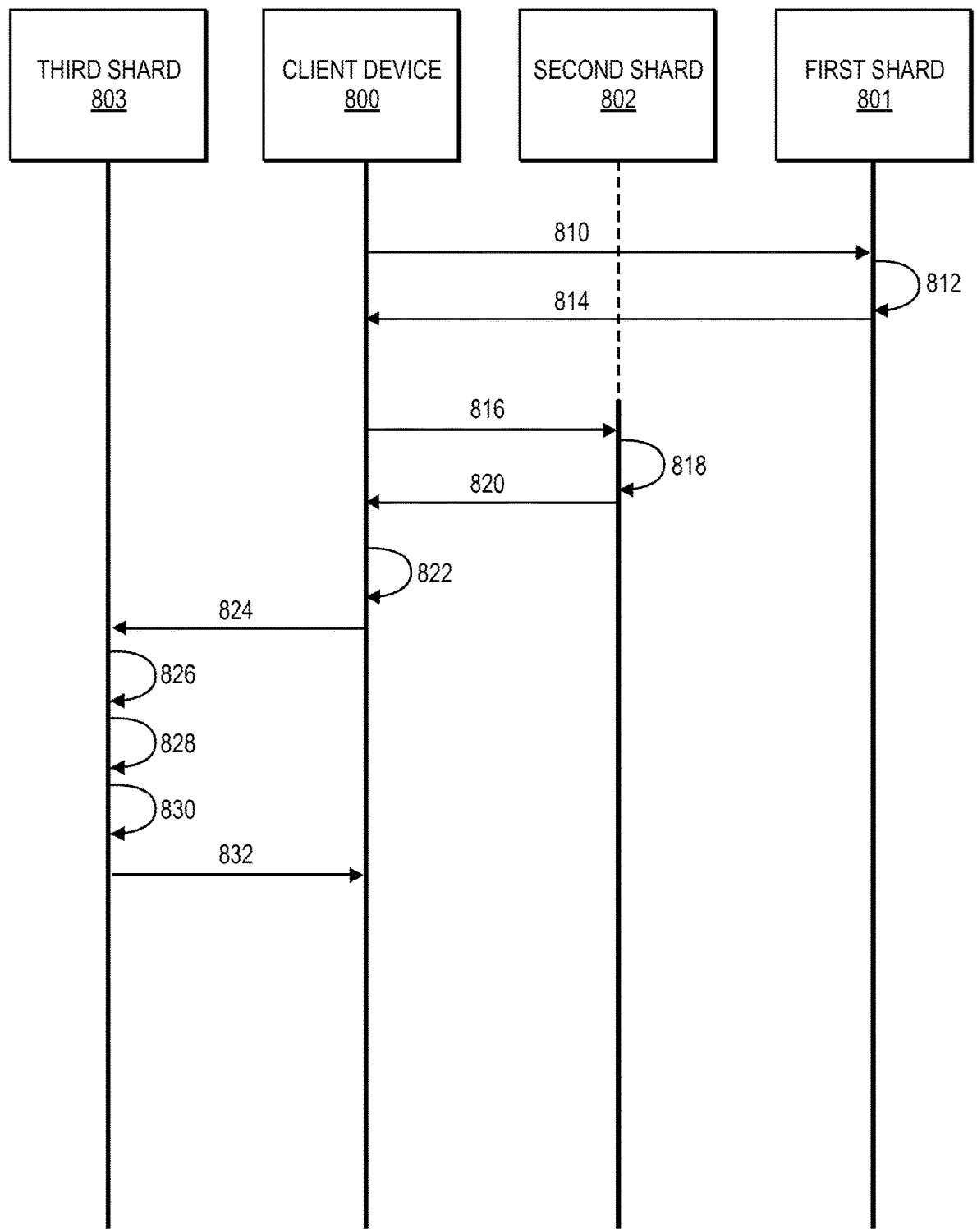
FIG. 8 shows a flowchart of a cross shard verification method according to embodiments.

FIG. 8 shows a flowchart of a cross shard verification method according to embodiments. The method illustrated in FIG. 8 will be described in the context of a transaction being processed and verified in a cross shard manner. In particular, a user can utilize a client device to request a transaction be included in a block of a blockchain. The inputs for the transaction may come from two different outputs included in blockchains of two different shards. The user may attempt to perform the transaction with a third shard using the two inputs maintained by a first shard and a second shard.

Prior to step 810, the client device 800 can obtain interaction data for an interaction. For example, the client device 800 can receive interaction data from a resource provider computer or other suitable device. The interaction data can include any suitable data related to the interaction that the client device 800 is attempting. For example, the interaction data can include an amount, a resource provider computer identifier, a date, item identifiers, etc.

At step 810, the client device 800 can provide a first proof request comprising a request for a first proof-of-inclusion from a first network shard 801 that maintains a first blockchain. The first proof-of-inclusion can be a proof that the client device 800 is associated with an unspent (or otherwise available) amount (e.g., a first amount). For example, the client device 800 may be associated with a first amount that is included into a block of the first blockchain. The first proof request can also comprise first interaction data associated with the first amount. The first amount can be a unspent transaction amount that is still available to the user (e.g., a UTXO). The first interaction data can be interaction data from a previous transaction (e.g., a first transaction). The first proof-of-inclusion can include a Merkle-proof on the first transaction that is included in a block of the first blockchain, the header of the block, and a commitment proof on the block.

At step 812, any suitable node computer of the first network shard 801 that receives the request from the first proof-of-inclusion from the client device 800 can determine whether or not the request can be fulfilled. For example, the node computer of the first network shard 801 can verify that the first amount is included in the blockchain by evaluating a current amount set (e.g., a UTXO set). In some embodiments, the amounts can be accumulated into an accumulator, as described herein. The node computer can evaluate whether or not the first amount is included into the accumulator.

In some embodiments, prior to providing the first proof-of-inclusion to the client device 800, the node computer of the first network shard 801 can remove the first amount from the accumulator. As such, the proof-of-inclusion can attest that the output referenced by an input is removed from the UTXO of the network shard maintaining the first amount.

At step 814, the node computer of the first network shard 801 provides the first proof-of-inclusion to the client device 800.

At steps 816-820, the client device 800 can request a second proof-of-inclusion from a second network shard 802. For example, the client device 800 can provide a second proof request comprising a request for a second proof-of-inclusion from a second network shard maintaining a second blockchain. The second proof-of-inclusion can be a proof that a second amount is available in the second blockchain maintained by the second network shard 802. The steps 816-820 are similar to the steps 810-814, and the descriptions thereof not be repeated here. Furthermore, steps 816-820 may occur before, during, or after steps 810-814. In some embodiments, the client device 800 can request one or more proof-of-inclusions from one or more shards.

At step 822, after receiving the first proof-of-inclusion from a first node computer of the first network shard 801 and the second proof-of-inclusion from a second node computer of the second network shard 802, the client device 800 can generate a commit interaction request message comprising the interaction data, the first proof-of-inclusion, and the second proof-of-inclusion.

At step 824, the client device 800 can provide the commit interaction request message to a third network shard 803 maintaining a third blockchain.

At step 826, a node computer of the third network shard 803 can verify the first proof-of-inclusion and the second proof-of-inclusion. For example, the node computer can verify the first proof-of-inclusion by first determining from which shard the first proof-of-inclusion originates. The node computer can determine the originator shard based on the block header included in the first proof-of-inclusion. For example, the block header can include a network shard number or first shard public key that can be utilized to determine that the first proof-of-inclusion originated from the first network shard.

After determining the originator shard of the first proof-of-inclusion, the node computer of the third network shard 803 can verify the commitment proof that the block is included in the first blockchain.

After verifying the block commitment proof, the node computer of the third network shard 803 can verify that the transaction associated with the first amount is included in the Merkle root of the block header included in the first proof-of-inclusion.

If the node computer of the third network shard 803 determines that first proof-of-inclusion originated from the first network shard, is associated with the first transaction that is included in a block, and that the block is included in the first blockchain, then the node computer can determine that the first proof-of-inclusion is valid. The node computer of the third network shard 803 can also validate the second proof-of-inclusion in a similar manner. The node computer of the third shard 803 can validate any suitable number of proof-of-inclusions.

At step 828, after validating the first proof-of-inclusion and the second proof-of-inclusion, the node computer of the third shard 803 can determine whether or not the user has enough funds as indicated by the first amount and the second amount, respectively associated with the first proof-of-inclusion and the second proof-of-inclusion. For example, the first amount and the second amount may be greater than or equal to the current transaction amount (e.g., a third amount). In some embodiments, the node computer of the third network shard 803 can perform step 828 before step 826 based on the alleged amounts that the client device 800 claims to have.

At step 830, after determining that the user of the client device 800 can perform the transaction, the node computer of the third network shard 803 can include the third transaction into a next block to propose to the plurality of node computers of the third network shard 803. The plurality of node computers can commit to the block as described herein and include the block with the third transaction into the third blockchain of the third network shard 803.

In some embodiments, at step 832, a node computer of the third network shard 803 can provide a confirmation response to the client device 800 that indicates that the third transaction is included into the third blockchain. For example, the client device can receive an interaction response message from node computer of the third network shard 103. The interaction response message can indicate that the interaction data in included in the third blockchain.

4. Replay Attacks

Various embodiments provide for the technical advantage of immunity to replay attacks. As shown by Sonnino et al. [7], cross-shard protocols of OmniLedger [4] and RapidChain [5] are susceptible to replay attacks. The cross-shard protocol described herein can be resilient to replay attacks as described below.

Consider the transaction T:=⟨ $I_1$, $I_2$ ⟩, O⟩ and suppose both $I_1$ and $I_2$ are valid so that the client device eventually creates the valid commit transaction $T_{com}$. Upon receiving $T_{com}$, the network shard $S_3$ includes it in a block and creates $O_3$. An adversary could attempt to send $T_{com}$ to the network shard $S_3$ multiple times so that the output $O_3$ is created in the network shard $S_3$ more than once as the verification passes each time.

To prevent this, shards can keep track of PoIs they processed. However, simply keeping a log of PoIs can require nodes to maintain an ever-growing list. To remedy this problem, embodiments can utilize an additional accumulator. That is, a network shard S maintains an accumulator $A_S^{POI}$ on the set of processed PoIs, and whenever a client device executes a cross-shard transaction with outputs to be created in S, the client device must provide valid non-membership proofs on PoIs to this accumulator.

For example, the updated commit transaction $T'_{comm}$ is given by, $$T'_{comm} = (T_{com}, NME^{M_{POI_{(I_1,S_1)}}}, NMEM^{M_{POI_{(I_2,S_2)}}}),$$

where $NME^{M_{POI_{(I_1,S_1)}}}$ is a non-membership proof on $POI_{(I_i,S_i)}$ with respect to accumulator $A_{S_i}^{POI}$. Further, by extending the block headers to maintain PoI accumulators, embodiments do not need modify the state transfer protocol to transfer the state processed PoIs.

5. Resetting Mempool Problem

Another technical problem with stateless blockchains is a resetting mempool problem. Consider a user that submits a valid transaction tx to the network when the height of the blockchain is k (e.g., Bk is at the tip of blockchain). If the network extends the blockchain with Bk+1 which excludes tx, tx becomes an invalid transaction with respect to the new state of the blockchain. Overall, whenever a new block is added to the blockchain, all the transactions in mempool become invalid because their membership proofs were created with respect to the old state. This can significantly reduce the throughput of the system. To prevent this, according to various embodiments, miners can cache the last c accumulators along with the processed transactions in the last c blocks where c could be an arbitrarily defined constant number. Then, a miner can consider a transaction valid if it is valid with respect to any of the cached accumulators and is not included in the cached processed transactions.

G. Shard Reconfiguration

To defend against adaptive adversaries who can corrupt new nodes over time, embodiments can shuffle nodes across shards. If f the configuration of the network shards stay the same, an adversary can focus on corrupting nodes in a single shard and eventually might take over it. A single super-corrupt shard is sufficient to violate the integrity of the whole protocol. To solve this problem, at the end of each epoch, nodes can generate a distributed randomness and are assigned to new shards based on the computed random value. Once a node is assigned to a new shard, the node gets the latest state of the node's new shard from the nodes who were in the network shard in the previous epoch.

VI. Configurable Quorums in Partial Synchrony

How to extend adjustable quorum idea to partial synchrony setting is described. In this setting, synchrony may not be relied upon to detect equivocation but rather, have to ensure non-equivocation by only using quorum certificates.

In the partially synchronous setting, safety and liveness of the BFT consensus protocols are ensured by setting the quorum size q to a value such that: (i) (safety) any two set of size q intersects in at least one honest node and (ii) (liveliness) there exists at least q honest nodes. First property helps an honest node to be convinced of non-equivocation without needing to use the message delay bound Δ. Second property allows honest nodes to make progress independent of corrupt nodes.

Now consider a group of m nodes such that f of them are corrupt. It can be seen that the minimal q value that ensures the safety property is $$q = \frac{m+f+1}{2}.$$

Also, if the number of honest nodes is greater than or equal to q (e.g., m−f≥q) liveness is also ensured. So, if embodiments sample shards of size m such that there exists a known upper bound f on the number of corrupt nodes for each shard, embodiments can ensure safety for each by setting q as above. Further, shards who have q or more honest nodes are able to make progress.

However, the problem in partial synchrony setting arises when embodiments consider cross-shard transactions or in general, external provability of commits. Suppose there is an external observer who queries a network shard. To proceed correctly, he has to get reply from at least one honest node. In the synchronous setting, he knows how much he has to wait, i.e., Δ is known, until he gets the replies of honest nodes. In the partial synchrony setting however, he has to wait until he gets f+1 messages until he can proceed. Now if number of honest nodes is less than f+1, corrupt nodes can stall the progress simply by remaining silent. To avoid this, embodiments may ensure each shard has at least f+1 honest nodes i.e., each shard can consist of honest-majority.

With honest-majority requirement, the minimal quorum size may be $$q = \frac{2f+1+f+1}{2} = 1.5f+1.$$

Figure 9:
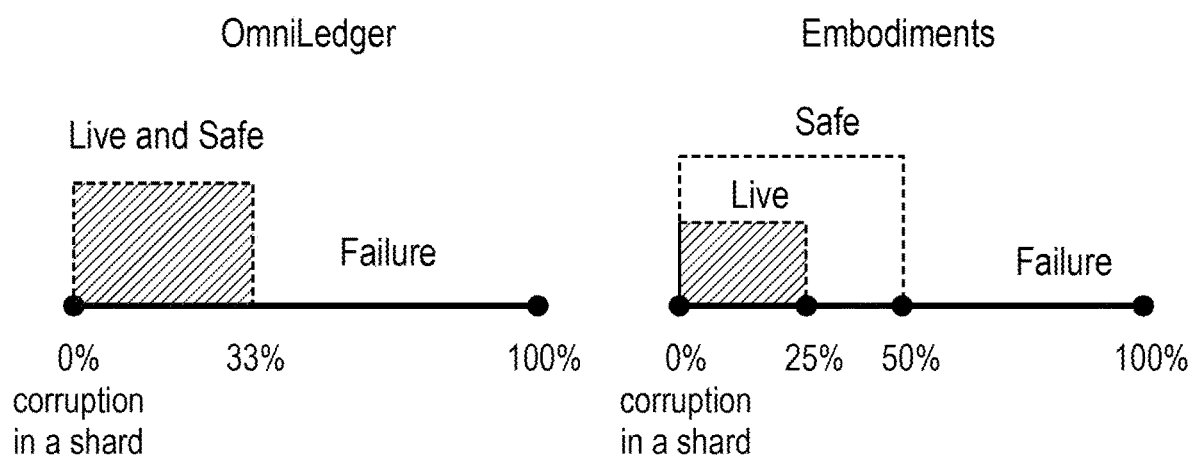
FIG. 9 shows an additional comparison of shard corruption of embodiments to previous work.

Wrapping up, in partial synchrony setting, embodiments may ensure that all shards are honest-majority except with negligible probability. In such a setting, only those who have more than 75% honest are able to make progress. As before, those shards who can make progress may be referred to as super-honest and the rest as safe. FIG. 9 illustrates how various embodiments compares to OmniLedger in a network of size N=1800 with F=25% corruption.

Figure 10:
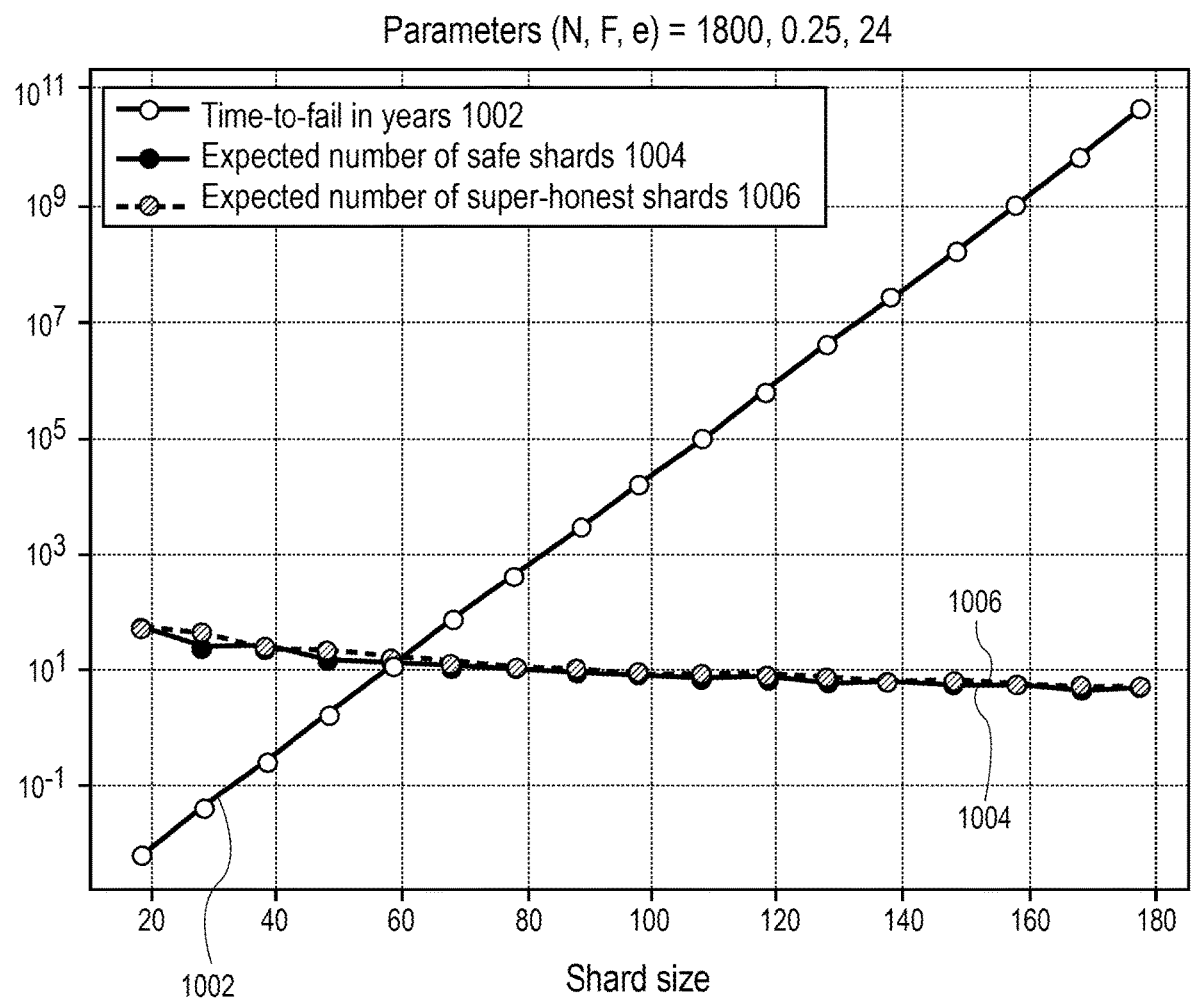
FIG. 10 shows a plot how shard size affects time-to-failure in partial synchrony according to embodiments.

The network shard size unlike the quorum size as in synchronous setting can be optimized. Authors of [4] report shard size m=600 in a network of size N=1800 with ¼ resiliency. This gives them a time-to-failure of 230 years and 3 shards that can process transactions in parallel. FIG. 10 illustrates an adjustable quorum according to embodiments in the same setting. FIG. 10 illustrates how shard size affects time-to-failure in partial synchrony. As can be seen, with a network shard size of 80, results in about 12 super honest shards all of which can make progress. The increase in the degree of parallelism is 4 times of OmniLedger.

Figure 11:
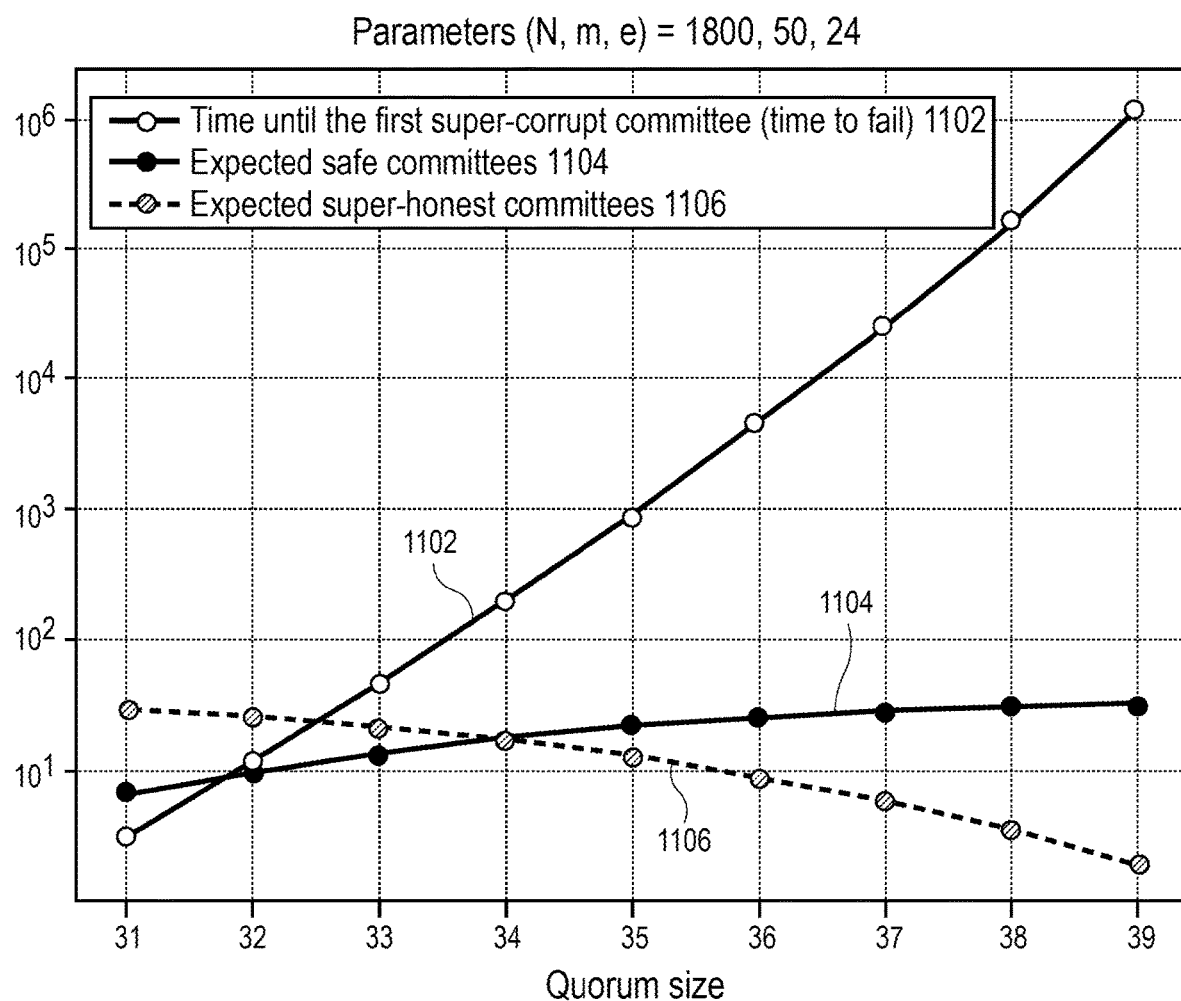
FIG. 11 shows a plot quorum size according to embodiments.

FIG. 11 shows a plot quorum size according to embodiments. FIG. 11 illustrates the time until the first super-corrupt committee 1102, the expected safe committees 1104, and the expected super-honest committees 1106 as a function of quorum size. As the quorum size increases in this example system, the time until the first super-corrupt committee (e.g., the time to failure) increases, the expected safe committees increases, and the expected super-honest committees decrease.

VII. Security Analysis

A. Proof of Intra-Shard Consensus

Proofs of safety and liveness may be provided for a network shard-wise consensus protocol in this section. The proofs can be similar to the proofs of Sync HotStuff [25] with a few modifications, and their terminology of direct/indirect commits is adopted here. In what follows, in some embodiments, a block $B_k$ is committed directly if an honest node commits it by obtaining a commit-certificate on it. Otherwise, a say a block $B_k$ is committed indirectly if it is a result of directly committing a block extending $B_k$.

If an honest node broadcasts a pre-commit message on a block $B_k$ in a view, then, (i) every honest node votes for $B_k$ in that view, and, (ii) every honest node receives $C(B_k)$ before entering the next view.

Proof. Suppose an honest node p broadcasts a pre-commit message for $B_k$ at time t in view v. This implies p have received and voted for $B_k$ at t−2Δ. Further, his pre-commit message is received by every honest node by t−Δ.

So, at t−Δ, every honest node may have voted for $B_k$ unless (i) they have voted for another block $B'_k$ or (ii) they have received and broadcast q blame messages before t−Δ. However, if either of these had happened, p would not have broadcast pre-commit as he would receive them by t.

Thus, at time t−Δ, all honest nodes are in view v and vote for $B_k$. Moreover, they do not enter a new view until t+Δ and by then, they receive the pre-commit message of p which also contains $C(B_k)$.

If an honest node broadcasts a pre-commit message on a block $B_k$, then there does not exist $C(B'_k)$ where $B'_k \neq B_k$.

Proof. Suppose an honest node p broadcasts a pre-commit message on $B_k$ in view v. It is shown a conflicting certificate does not exist prior to, in, or after view v. Firstly, if conflicting certificate exists prior to view v, then at least one of the votes comes from an honest node. This vote would have reached p before view v and would have prevented p from broadcasting pre-commit. Secondly, by Lemma 0.1, all honest nodes vote for $B_k$ in view v. Thus, a conflicting height-k certificate cannot be formed in view v. Lastly, again by Lemma 0.1, every honest node receives $C(B_k)$ before entering view v+1, and,s there was no conflicting height-k certificate up until then. From then on, the highest certified block of every honest node is at least $B_k$, and no honest node will vote for a height-k block any more. Thus, no $C(B'_k)$ where $B_k \neq B_k$ can come into existence in views greater than v. (Safety). Honest nodes always commit the same block $B_k$ for each height k.

Proof. Suppose for contradiction that two distinct blocks $B_k$ and $B_{k'}$ are committed at height k. Suppose $B_k$ is committed as a result of $B_l$ being directly committed in view v and $B_{k'}$ is committed as a result of $B_{l'}$ being directly committed in view v'. This implies $B_l$ extends $B_k$ and $B_{l'}$ extends $B_{k'}$. Without loss of generality, assume l≤l' By Lemma 0.1, there exists no other certified block at height l. If l=l', then $B_{l'}=B_l$, if l<l', then $B_{l'}$ extends $B_l$. In either case, $B_k=B_{k'}$.

(Liveness). (i) A view change will not happen if the current leader is honest; (ii) A Byzantine leader can propose p blocks in (2p+1)Δ time to avoid a view change; and (iii) If k is the highest height at which some honest node has committed a block in view v, then leaders in subsequent views can propose blocks at heights higher than k.

Proof. For (i), note that an honest leader L is able to propose p blocks in (2p+1)Δ time. Immediately after entering its view, L needs Δ time to gather status; after that, it can propose a block every 2Δ time: one Δ for its proposed block to reach all nodes and another Δ for other nodes votes to arrive. Thus, an honest leader has sufficient time and does not equivocate, so it will not be blamed by any other honest node. On the other hand, if a Byzantine leader delays beyond the above allotted time, it will be blamed by all honest nodes. For part (iii), observe that all honest receive $C(B_k)$ due to Lemma 0.1. Hence, in status of subsequent views, they all report a certified block at height at least k. If the leader does not propose a block with a height higher than k within 3Δ, it will be blamed by all honest nodes.

B. Proof of Safe Shard Detector

Proof. Let p be an honest node in a super-honest shard $S_i$. Consider the vote inactivity case described in section IV.C. After p votes for a block $B_k$, it may be known that all honest nodes vote for $B_k$ within Δ unless they receive either an equivocating block for L or q blame messages on v before receiving $B_k$. If the latter case happens, p receives the equivocating blocks or the blame certificate on v within 2Δ. In the former case which all honest nodes vote for $B_k$, p receives at least q votes on $B_k$ within 2Δ. So, if none of these had happened, it can be the case that $S_i$ is a safe shard.

Similarly, for pre-commit inactivity case, after p broadcasts a pre-commit for a block $B_k$ at time t, either all honest nodes broadcast a pre-commit for $B_k$ until t+Δ, or the corrupt leader will send an equivocating block to some of the nodes to prevent them from broadcasting pre-commit which can be received by them until t+Δ. So, by t+2Δ, p receives either an equivocating block for L or at least q pre-commit messages on $B_k$.

For blame inactivity, suppose p receives and broadcasts an equivocation proof at time t. Every honest node receives the equivocation proof by t+Δ and they broadcast a blame message once they do. So at least q blames can be received by p until t+2Δ.

For view-change inactivity, suppose p enters a new view at t. Then every honest node enters the new view by t+Δ the latest. If leader does not propose to any of them, within 3Δ, at least q blame messages will be accumulated by p by t+5Δ the latest. Otherwise, p receives leader's proposal from another node's re-proposal by t+5Δ the latest.

Finally, the last point is due to the fact that the number of corrupt nodes in a super-honest shard is at most m−q. So, there can be at most m−q view-changes within an epoch in a super-honest shard. So, a node who does more than m−q view changes can be in a safe-shard.

Proof. Due to Lemma 1, it can be seen that, corrupt nodes in a safe shard either has to produce valid blocks or do view-changes to avoid honest nodes from sending shutdown requests. Since the number of view-changes that can be done is bounded, a safe shard either builds a chain or shutdown.

Embodiments of the invention have a number of advantages. For example, a plurality of shards, where a network shard includes a plurality of nodes, can create blocks for a blockchain maintained at each shard. Interaction processing throughput can be high due to many shards being present in embodiments. In some cases, more shards may be created for a system since smaller shards can be created according to embodiments, than in prior works. All of this can be done while also having a high time to failure, as described above.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

VIII. References

[1] J. Poon and T. Dryja, "The bitcoin lightning network: Scalable off-chain instant payments," https://lightning.network/lightning-network-paper. pdf, 2016.

[2] T. Groenfeldt, "Real-time payments will get real in the u.s. in 2019," https://www.forbes.com/sites/tomgroenfeldt/2019/03/05/real-time-payments-will-get-real-in-the-u-s-in-2019/#65552e787dfe, March 2019, (Accessed on Nov. 8, 2019).

[3] L. Luu, V. Narayanan, C. Zheng, K. Baweja, S. Gilbert, and P. Saxena, "A secure sharding protocol for open blockchains," in *Proceedings of the 2016 ACM SIGSAC Conference on Computer and Communications Security*, ser. CCS '16. ACM, 2016, pp. 17-30. [Online]. Available: http://doi.acm.org/10.1145/2976749.2978389

[4] E. Kokoris-Kogias, P. Jovanovic, L. Gasser, N. Gailly, E. Syta, and B. Ford, "OmniLedger: A secure, scale-out, decentralized ledger via sharding," in 2018 *IEEE Symposium on Security and Privacy (S&P)*, 2018, pp. 19-34. [Online]. Available: doi.ieeecomputersociety.org/10.1109/SP.2018.000-5

[5] M. Zamani, M. Movahedi, and M. Raykova, "RapidChain: Scalinging," in 2018 *ACM Conference on Computer and Communications Security (CCS)*, 2018.

[6] M. Pease, R. Shostak, and L. Lamport, "Reaching agreement in the presence of faults," *Journal of the ACM (JACM)*, vol. 27, no. 2, pp. 228-234, 1980.

[7] A. Sonnino, S. Bano, M. Al-Bassam, and G. Danezis, "Replay attacks and defenses against cross-shard consensus in sharded distributed ledgers," *CoRR*, vol. abs/1901.11218, 2019. [Online]. Available: http://arxiv.org/abs/1901.11218

[8] S. Nakamoto, "Bitcoin: A peer-to-peer electronic cash system," 10 2008, available at https://bitcoin.org/bitcoin.pdf.

[9] M. Fischer, N. Lynch, and M. Paterson, "Impossibility of distributed consensus with one faulty process," *Journal of the ACM (JACM)*, vol. 32, no. 2, pp. 374-382, 1985.

[10] S. Micali, S. Vadhan, and M. Rabin, "Verifiable random functions," in *Proceedings of the 40th Annual Symposium on Foundations of Computer Science*, ser. FOCS '99. IEEE Computer Society, 1999, pp. 120—. [Online]. Available: http://dl.acm.org/citation.cfm?id=795665.796482

[11] S. Micali, "ALGORAND: the efficient and democratic ledger," *CoRR*, vol. abs/1607.01341, 2016. [Online]. Available: http://arxiv.org/abs/1607.01341

[12] B. Awerbuch and C. Scheideler, "Towards a scalable and robust DHT," in *Proceedings of the Eighteenth*

*Annual ACM Symposium on Parallelism in Algorithms and Architectures*, ser. SPAA '06. ACM, 2006, pp. 318-327. [Online]. Available: http://doi.acm.org/10.1145/1148109.1148163

[13] V. Buterin, "The stateless client concept-sharding-ethereum re-search," https://ethresear.ch/t/the-stateless-client-concept/172, October 2017, (Accessed on Jan. 30, 2020).

[14] J. Drake, "Accumulators, scalability of utxo blockchains, and data availability-sharding-ethereum research," https://ethresear.ch/t/accumulators-scalability-of-utxo-blockchains-and-data-availability/176, October 2017, (Accessed on Jan. 30, 2020).

[15] D. Boneh, B. Bünz, and B. Fisch, "Batching techniques for accumulators with applications to iops and stateless blockchains." *IACR Cryptology ePrint Archive*, vol. 2018, p. 1188, 2018.

[16] M. Andrychowicz and S. Dziembowski, *PoW-Based Distributed Cryptography with No Trusted Setup*. Springer Berlin Heidelberg, 2015, pp. 379-399. [Online]. Available: https://doi.org/10.1007/978-3-662-48000-7_19

[17] C. Decker, J. Seidel, and R. Wattenhofer, "Bitcoin meets strong consistency," in *Proceedings of the 17th International Conference on Distributed Computing and Networking*, ser. ICDCN '16. ACM, 2016, pp. 13:1-13:10. [Online]. Available: http://doi.acm.org/10.1145/2833312.2833321

[18] R. Pass and E. Shi, "Hybrid consensus: Efficient consensus in the permissionless model," Cryptology ePrint Archive, Report 2016/917, 2016, http://eprint.iacr.org/2016/917.

[19] R. Karp, C. Schindelhauer, S. Shenker, and B. Vocking, "Randomized rumor spreading," in *Proceedings of the 41st Annual Symposium on Foundations of Computer Science*, ser. FOCS '00. IEEE Computer Society, 2000, pp. 565—. [Online]. Available: http://dl.acm.org/citation.cfm?id=795666.796561

[20] Y. Gilad, R. Hemo, S. Micali, G. Vlachos, and N. Zeldovich, "Algorand: Scaling byzantine agreements for cryptocurrencies," in *Proceedings of the 26th Symposium on Operating Systems Principles*, ser. SOSP '17. ACM, 2017, pp. 51-68. [Online]. Available: http://doi.acm.org/10.1145/3132747.3132757

[21] I. Abraham, D. Malkhi, K. Nayak, L. Ren, and A. Spiegelman, "Solida: A blockchain protocol based on reconfigurable byzantine consensus," in *Proceedings of the 21st International Conference on Principles of Distributed Systems*, ser. OPODIS '17, 2017.

[22] E. K. Kogias, P. Jovanovic, N. Gailly, I. Khoffi, L. Gasser, and B. Ford, "Enhancing bitcoin security and performance with strong consistency via in 25th {USENIX} Security Symposium ({USENIX} Security 16), 2016, pp. 279-296.

[23] R. Gennaro, S. Jarecki, H. Krawczyk, and T. Rabin, "Secure distributed key generation for discrete-log based cryptosystems," in *Proceedings of the 17th International Conference on Theory and Application of Cryptographic Techniques*, ser. EUROCRYPT'99. Berlin, Heidelberg: Springer-Verlag, 1999, pp. 295-310. [Online]. Available: http://dl.acm.org/citation.cfm?id=1756123.1756153.

[24] T. Hanke, M. Movahedi, and D. Williams, "Dfinity technology overview series, consensus system," *arXiv preprint arXiv*:1805.04548, 2018.

[25] I. Abraham, D. Malkhi, K. Nayak, L. Ren, and M. Yin, "Sync hotstuff: chine replication," Cryptology ePrint Archive, Report 2019/270, 2019, https://eprint.iacr.org/2019/270.

What is claimed is:

1. A method comprising:

broadcasting, by a node computer, a propose message comprising a new block of transactions for a blockchain and a previous block certificate for a previous block to a plurality of node computers in a network shard, the previous block certificate including data indicating that the previous block was committed to the blockchain which comprises a threshold signature that was generated based on a quorum of signed vote messages for the previous block from nodes in the network shard, the plurality of node computers in the network shard being a sub-group of node computers in a computer network comprising a plurality of network shards including the network shard;

receiving, by the node computer, at least one vote message from the plurality of node computers after the plurality of node computers verify the previous block certificate, the at least one vote message indicating verification of the new block of transactions;

after a predetermined amount of time, receiving, by the node computer, a plurality of pre-commit messages comprising at least the new block of transactions and a new block certificate created based on the at least one vote message; and if a number of received pre-commit messages of the plurality of pre-commit messages is greater than a quorum value associated with the network shard, committing, by the node computer, the new block of transactions to the blockchain.

2. The method of claim 1, wherein the propose message comprises a view number.

3. The method of claim 1, wherein the plurality of node computers in the network shard are a first plurality of node computers in a first network shard maintaining the blockchain which is a first blockchain, wherein the quorum value is a first quorum value, and wherein a second plurality of node computers in a second network shard maintaining a second blockchain is associated with a second quorum value.

4. The method of claim 3 further comprising:

generating, by the node computer, a shutdown message based on an inactivity timer associated with the first network shard; and transmitting, by the node computer, the shutdown message to the second plurality of node computers in the second network shard, wherein the second network shard is a network reference shard, wherein the reference network shard determines to shutdown the first network shard and distributes the first plurality of node computers to a plurality of additional shards.

5. The method of claim 3, wherein prior to broadcasting the propose message, the method further comprises:

receiving, by the node computer, a commit interaction request message from a client device, the commit interaction request message comprising interaction data and one or more proof-of-inclusions created by one or more shards, wherein at least one proof-of-inclusion of the one or more proof-of-inclusions is created by the second network shard;

verifying, by the node computer, the one or more proof-of-inclusions; and if the one or more proof-of-inclusions are valid, including, by the node computer, at least the interaction data in the new block.

6. The method of claim 1, wherein the new block comprises a block header and a block body, wherein the block header is a tuple comprising at least an accumulator value.

7. The method of claim 6, wherein after committing the new block to the blockchain the method further comprises:
removing, by the node computer, the block body from a memory of the node computer.

8. The method of claim 1, wherein the plurality of node computers in the network shard includes 20 to 200 node computers, and wherein the quorum value is in a range of 25 to 40.

9. The method of claim 1 further comprising:
after receiving, the plurality of pre-commit messages, verifying, by the node computer, the plurality of pre-commit messages.

10. The method of claim 1, wherein the transactions are payment transactions.

11. A node computer comprising:
a hardware processor, and
a non-transitory computer readable medium coupled to the hardware processor, the non-transitory computer readable medium comprising code, executable by the hardware processor, to implement a method comprising:
broadcasting a propose message comprising a new block of transactions for a blockchain and a previous block certificate for a previous block to a plurality of node computers in a network shard, the previous block certificate including data indicating that the previous block was committed to the blockchain which comprises a threshold signature that was generated based on a quorum of signed vote messages for the previous block from node computers in the network shard, the plurality of node computers in the network shard being a sub-group of node computers in a computer network comprising a plurality of network shards including the network shard;
receiving at least one vote message from the plurality of node computers after the plurality of node computers verify the previous block certificate, the at least one vote message indicating verification of the new block of transactions;
after a predetermined amount of time, receiving a plurality of pre-commit messages comprising at least the new block of transactions and a new block certificate created based on the at least one vote message; and
if a number of received pre-commit messages of the plurality of pre-commit messages is greater than a quorum value associated with the network shard, committing the new block of transactions to the blockchain.

12. The node computer of claim 11, wherein the propose message comprises a view number, wherein each pre-commit message of the plurality of pre-commit messages comprises the view number, and wherein the method further comprises:
after receiving, the plurality of pre-commit messages, verifying the plurality of pre-commit messages using at least the view number in each pre-commit message.

13. The node computer of claim 11, wherein prior to broadcasting the propose message, the method further comprises:
receiving a commit interaction request message from a client device, the commit interaction request message comprising interaction data and one or more proof-of-inclusions;
verifying, by the node computer, the one or more proof-of-inclusions; and
if the one or more proof-of-inclusions are valid, including, by the node computer, at least the interaction data in the new block.

14. The node computer of claim 11, wherein the network shard is a network reference shard and the node computer is a first node computer and is a current leader of the reference network shard maintaining a first blockchain, wherein a second plurality of node computers in a second network shard maintain a second blockchain, and wherein the method further comprises:
receiving one or more shutdown messages from the second plurality of node computers;
if a number of received shutdown messages of the one or more shutdown messages is greater than a shutdown threshold associated with the second network shard, assigning each node computer of the second plurality of node computers to a null network shard in a node-to-shard table for a present epoch; and
reassigning new transactions from the second network shard to a third shard.

15. The node computer of claim 14, wherein a network comprises a plurality of shards including the reference network shard and the second network shard, and wherein the method further comprises:
broadcasting a propose table update message comprising the node-to-shard table to the plurality of node computers in the reference network shard;
performing a commitment process to commit the reference network shard to the node-to-shard table; and
if the reference network shard commits to the node-to-shard table, broadcasting the node-to-shard table to the network, wherein after receiving the node-to-shard table, the second plurality of node computers stop processing new blocks for the second blockchain.

16. The node computer of claim 11, wherein the method further comprises:
prior to broadcasting the propose message, generating the new block, wherein the new block comprises a block header and a block body.

17. The node computer of claim 16, wherein the block header is a tuple comprising at least an accumulator value, a block height, an epoch number, a root of a Merkle tree, and a digest of a previous block header of the previous block in the blockchain, wherein generating the new block comprises:
determining the accumulator value using an accumulator over one or more latest amounts of the blockchain.

18. The node computer of claim 17, wherein after committing the new block to the blockchain the method further comprises:
removing the block body from a memory of the node computer.

19. The node computer of claim 11, wherein the plurality of node computers in the network shard are a first plurality of node computers in a first network shard maintaining the blockchain which is a first blockchain, wherein the quorum value is a first quorum value, and wherein a second plurality of node computers in a second network shard maintaining a second blockchain is associated with a second quorum value, wherein the first network shard and the second network shard include a same number of node computers, and wherein the first quorum value is equal to the second quorum value.

20. The node computer of claim 11, wherein the quorum value is a predetermined value.

\* \* \* \* \*